US008064586B2

(12) United States Patent  
Shaffer et al.

(10) Patent No.: US 8,064,586 B2
(45) Date of Patent: *Nov. 22, 2011

(54) REAL-TIME PROCESS FOR DEFINING, PROCESSING AND DELIVERING A HIGHLY CUSTOMIZED CONTACT LIST OVER A NETWORK

(75) Inventors: James D. Shaffer, Rancho Santa Fe, CA (US); George G. Moore, Great Falls, VA (US)

(73) Assignee: Targus Information Corporation, Vienna, VA (US)

( * ) Notice: Subject to any disclaimer, the term of this patent is extended or adjusted under 35 U.S.C. 154(b) by 1115 days.

This patent is subject to a terminal disclaimer.

(21) Appl. No.: 11/673,485

(22) Filed: Feb. 9, 2007

(65) Prior Publication Data

US 2007/0127702 A1 Jun. 7, 2007

Related U.S. Application Data

(63) Continuation of application No. 09/678,752, filed on Oct. 3, 2000, now Pat. No. 7,243,075.

(51) Int. Cl.
*H04M 3/42* (2006.01)
(52) U.S. Cl. .................... 379/211.02; 709/223
(58) Field of Classification Search ............. 379/211.02; 709/223
See application file for complete search history.

(56) References Cited

U.S. PATENT DOCUMENTS

| 3,614,328 A | 10/1971 | McNaughton et al. |
| 3,881,060 A | 4/1975 | Connell et al. |
| 4,191,860 A | 3/1980 | Weber |
| 4,310,726 A | 1/1982 | Asmuth |
| 4,611,094 A | 9/1986 | Asmuth et al. |

(Continued)

FOREIGN PATENT DOCUMENTS

CA 2056203 11/1991

(Continued)

OTHER PUBLICATIONS (Tampa) Tribune Newspaper articles, One phone number is the latest Domino's theory, Sep. 14, 1992 and Springston, C. Dominos tries out 950 prefix, Sep. 18, 1992, 2 pages.

(Continued)

*Primary Examiner* — Quynh Nguyen
(74) *Attorney, Agent, or Firm* — Procopio, Cory, Hargreaves & Savitch, LLP

(57) ABSTRACT

A real-time, interactive system and method of building a list of contact records, such as a mailing list, on a computer network based on selected criteria. A list specification is generated, which may include interactively specifying a geographically defined area for which a contact list is desired including receiving user input, and interactively selecting a product from a plurality of products and a threshold score for the product including receiving user input. The list specification may be transmitted over the computer network to a server where the contact list is built in real-time based on the list specification. If a set of characteristics of the contact list, such as number of records generated or cost, are approved by the user, the contact list is transmitted to a user-specified node on the computer network. The list specification may be stored in memory for reuse by a business, such as a chain of stores. This feature provides a way to easily regenerate new and updated contact lists at future dates for all or a subset of the stores by accessing updated source databases without having to re-specify the list every time a fresh list is required.

52 Claims, 14 Drawing Sheets

U.S. PATENT DOCUMENTS

| | | | |
|---|---|---|---|
| 4,611,096 | A | 9/1986 | Asmuth et al. |
| 4,757,267 | A | 7/1988 | Riskin |
| 4,797,818 | A | 1/1989 | Cotter |
| 4,827,500 | A | 5/1989 | Binkerd et al. |
| 4,908,850 | A | 3/1990 | Masson et al. |
| 4,924,491 | A | 5/1990 | Compton et al. |
| 5,001,710 | A | 3/1991 | Gawrys et al. |
| RE1,470 | E | 5/1991 | Riskin |
| 5,036,535 | A | 7/1991 | Gechter et al. |
| 5,043,736 | A | 8/1991 | Darnell et al. |
| 5,095,505 | A | 3/1992 | Finucane et al. |
| 5,109,399 | A | 4/1992 | Thompson |
| 5,136,636 | A | 8/1992 | Wegrzynowicz |
| 5,161,180 | A | 11/1992 | Chavous |
| 5,235,630 | A | 8/1993 | Moody et al. |
| 5,235,633 | A | 8/1993 | Dennison et al. |
| 5,289,527 | A | 2/1994 | Tiedemann, Jr. |
| 5,311,572 | A | 5/1994 | Friedes et al. |
| 5,329,578 | A | 7/1994 | Brennan et al. |
| 5,334,974 | A | 8/1994 | Simms et al. |
| 5,353,023 | A | 10/1994 | Mitsugi |
| 5,379,337 | A | 1/1995 | Castillo et al. |
| 5,389,935 | A | 2/1995 | Drouault et al. |
| 5,414,432 | A | 5/1995 | Penny, Jr. et al. |
| 5,506,897 | A | 4/1996 | Moore et al. |
| 5,533,107 | A | 7/1996 | Irwin et al. |
| 5,805,688 | A | 9/1998 | Gillespie et al. |

FOREIGN PATENT DOCUMENTS

| | | |
|---|---|---|
| EP | 0493896 A2 | 5/1991 |
| JP | 3235562 | 10/1991 |
| JP | 5300061 | 11/1993 |

OTHER PUBLICATIONS

Ambrosch, W.D. et al. The Intelligent Network, A Joint Study by Bell Atlantic, IBM and Siemens, Title page, Copyright Page, and Ch. 9 pp. 162-177, ISBM 3-540-50897-X, Copyright Springer-Verlag Berlin Heidelbert 1989.

Andrews, Jr., F.T. et al. Stored Program Controlled Network, The Bell System Technical Journal, Sep. 1982, vol. 61, No. 7, Part 3, Title page and pp. 1573-1815.

Applied Telematics, Inc. Brochure and Information Sheet, The Applied Telematics Dealer Search Method and How to Increase the Effectiveness of Your Advertising Without Changing a Word, Apr. 26, 1988, 3 pages.

*Applied Telematics, Inc. v. Sprint Communications*, Declaration of Bryan Beaty, Civil Action No. 94-4603, U.S. District Court, Eastern District of Pennsylvania, Mar. 20, 1995, 107 pages.

*Applied Telematics, Inc. v. Sprint Communications*, Deposition of Bryan Beaty, Civil Action No. 94-4603, U.S. District Court, Eastern District of Pennsylvania, Jan. 18, 1996, 211 pages.

Applied Telematics, Inc., Headquarters and Remote Routing Center Call Processing schematics, Jan. 14, 1987, 3 pages.

Atlas Software Boundary and Data File Catalog, Copyright 1987, 1988, 1989, 1990 Strategic Mapping, Inc., 5 pages.

Atlas Software Desktop Map Library, Strategic Mapping, Inc., date unknown, 5 pages.

Atlas Software Desktop Sample Maps and Order Form, Strategic Mapping, Inc., date unknown, 5 pages.

Baechler, Donald O., Letter to All Current Recipients of TRA Products, Nov. 10, 1989, 8 pages.

Baechler, Donald O., Memo to Recipients of the Local Exchange Routing Guide (LERG) Data Type, Nov. 1, 1989, Bellcore, 20 pages.

Beaty, Bryan. Letter to Mr. Dale Inlow dated Jul. 21, 1992, 1 page.

Berman, Roger K. et al. Perspectives on the AIN Architecture, IEEE Communications Magazine, Feb. 1992, pp. 27-32.

Blankenhorn, Dana. MCI improves 800 services—MCI Communications Corp.'s 800 Enhanced Call Router Service, Newsbytes News Network, Sep. 15, 1992, copyright 1992 Washingtonpost Newsweek interactive, 2 pages.

Computer Marketing Corporation Brochure, The Complete Computer System for Domino's Pizza Stores, 8 pages, Feb. 9, 2007.

Computer-Consoles; (CCI) CCI's LIFE-911 system features most advanced technology, Lexis printout, Copyright 1986 Business Wire, Inc., Oct. 22, 1986, 3 pages.

Delong Jr., Edgar S. Making 911 even better, Telephony, Dec. 14, 1987, pp. 60-63.

DeNigris, Ernest G. et al. Enhanced 911: emergency calling with a plus, Bell Laboratories Record, Mar. 1980, pp. 74-79.

Equifax Marketing Decision Systems, Brochure, Tiger Stalks the Streets on Infomark, Equifax Inc copyright Jan. 1991, 2 pages.

Equifax National Decision Decision Systems, Brochure, Desktop Marketing Information System Infomark for Windows Solutions, 1991, 11 pages.

Equifax National Decision Systems, Brochure, Introducing Infomark for Windows, Equifax Inc. copyright Apr. 1991, 2 pages.

Gibbs, Charlie. Memo to Stephen Keyes dated Aug. 18, 1986 with letter from Bernard N. Riskin attached, 3 pages.

Gunderson, Gary W. Computer-Consoles; Can your community save lives when seconds count? Lexis printout, Copyright 1987 Business Wire, Inc., Feb. 11, 1987, 3 pages.

Haas, Alan. Pizza Wars, US Air, Apr. 1988, pp. 79-85, and fax cover sheet from Peter Wagner dated Feb. 27, 2003.

Harvey, Dea. E. et al. Call Center Solutions, AT&T Technical Journal, Sep./Oct. 1991, pp. 36-44.

Head, Charles S. Intelligent Network: A Distributed System, IEEE Communications Magazine, Dec. 1988, pp. 16-20, 63.

Hirsch, Phil. AT&T Service to Link Users Through Touch-Tone Phones, Lexis printout, Copyright 1983 Computerworld, Inc., 2 pages.

Honig, William L. et al. The Realities of Service Creation on Switching Systems Through Attached Processors, XIII International Switching Symposium, Stokholm-Sweden, May 27-Jun. 1, 1990, Session B9, Paper #4, Proceedings, vol. VI, pp. 51-54.

Hunter, Paul P. The Sources of Innovation in New Jersey Bell Switching Services, Thesis, Masachusetts Institute of Technology Library Archive, Jun. 27, 1991, pp. 1-105.

Hursey, Douglas M. 800 Service in Bellsouth, 1986 IEEE, pp. 1330-1335.

Industry Requirements and Standards, E911 Public Safety Answering Point: Interface Between a 1/1AESS™ Switch and Customer Premises Equipment Table of Contents, Jun. 2003, Issue 1, 6 pages.

Infomark Laser PC System Reference Manual, Aug. 1991, 703 pages.

Information Disclosure Statement filed in U.S. Appl. No. 08/598,382, filed May 28, 1998, 3 pages.

Joint Interim Hearing on The 911 Emergency Response System—an Overview of its Effectiveness, Nov. 21, 1990, Los Angeles, CA, 106 pages.

Kwan, Robert K. et al. Globalstar: Linking the World via Mobile Connections, IEEE International Symposium on Personal, Indoor and Mobile Radio Communications, King's College London (U.K.), Copyright 1991, 7 pages.

Letter and attachments from Brian Follett to Jon Plening, Jun. 26, 1991, 81 pages.

Letter from Bert Johnson to Mr. Dan Gonos, Mar. 16, 1990, 1 page.

Letter from Diane M. Hutchinson to Sue Monhait dated May 9, 1990 with attachment, 2 pages.

Letter from Gina K. Marks to Mr. Paul Kluempers dated Apr. 13, 1992, 4 pages.

Letter from Philip J. Gross of Phone Base Sytems, Incorporated to Mr. Ian Michel, Applied Telematics, Inc. dated Apr. 2, 1990 regarding settlement offer, 10 pages.

Letter of Intent from Paul Kluempers to Gina K. Marks dated Apr. 22, 1992, 3 pages.

Lineback, J. Robert. Zip-Code Data Base Does a Lot More than Sort Mail, Lexis printout NEWS: Data Processing; p. 19, Copyright 1986 McGraw-Hill, Inc., 1 page.

Marketline, Inc. brochure, undated, 11 pages.

McInerney, Lori. Catching Up to Voice Processing, Inbound/Outbound Magazine, Mar. 1991, pp. 46-54.

McIntyre, Harris B. What is this New V-H System?, New England Telephone and Telegraph Company, No. 33, Dec. 1959, 13 pages.

MediaTrak Advanced Marketing, Inc. Letter to Ms. Diane Thomas dated Jul. 30, 1992, 3 pages.

Melissa, Raymond. New! Zip Code Software Catalog, Fall 1990, No. 6, title pages, pp. 12-13.

Melissa, Raymond. Zip Code Software Catalog, Summer 1991, No. 8, 35 pages.

Mosbacher, Robert A. et al. Tiger/Line Census files, 1990 Technical Documentation, Washington D.C., 1991, 37 pages.

*Murex Securities Limited et al.* v. *Vicinity Corporation et al.*, Eastern District of Virginia, Alexandria Division, Civil Action No. 01-1895-A, Defendant Victory Corporation and Pizza Hut, Inc.'s Notice of Declaration of Brian Follett in Support of Defendants' Defenses and Counterclaims of Invalidity, May 23, 2002, 29 pages.

Murphy, J.W. et al. Intelligent Network Control of BOC 800 Serivce, The Service Management System, 1986 IEEE, pp. 1320-1324.

National Communications System, Office of Technology & Standards. Telecommunications: Glossary of Telecommunication Terms, Federal Standard 1037B, Jun. 3, 1991, 386 pages.

National Decision Systems, Infomark LaserPC System, Copyright 1986, 4 pages.

National Decision Systems, MicroVision-Custom, The Micro-Geographic Consumer Targeting System that Provides the Ultimate in Customer Segmentation, copyright Jan. 1990 National Decision Systems, 6 pages.

National Decision Systems. Brochure on Infomark Express, date unknown, 6 pages.

National Decision Systems. Brochure on MicroVision-50, The Micro-geographic Consumer Targeting System for All Target Marketing Applications, copyright Jan. 1990, 6 pages.

National Decision Systems. Your Single Source Guide for Demographic and Marketing Information brochure, copyright Apr. 1988, 31 pages.

Nelson, Sharon L. et al. Report on Feasibility of Statewide Enhanced 9-1-1, Submitted to the Washington State Legislature, Jan. 14, 1991, 197 pages.

Newsletter, Crutchfied, T., editor. The Pizza Store Weekly, Domino's Pizza, vol. 1, No. 15 Nov. 3, 1986, 1 page.

Newsletter, Crutchfied, T., editor. The Pizza Store Weekly, Domino's Pizza, vol. 1, No. 22, Dec. 22, 1986, 1 page.

Newsletter, Network World, The Newsweekly of User Networking Strategies, vol. 8, No. 32, Aug. 21, 1991, 4 pages.

Newsletter, Store Systems, vol. 1, Issue 1, Mar. 1989, 7 pages.

Patriot Communications LLc, Enhanced Routing Services information sheet, date unknown, 1 page.

PR Newswire regarding American Telephone and Telegraph Company, Apr. 26, 1982, Lexis printout, 2 pages.

PSAP Operations Guide for Wireless 9-1-1, intrado Informed Response, Jul. 2005, 30 pages.

Ramirez, Anthony. The Pizza Version of Dialing '911', The New York Times, Sep. 9, 1991, 3 pages.

Schmandt, Jurgen et al., editors. The New Urban Infrastructure, Cities and Telecommunications, ISBM 0-275-93591-4, Copyright 1990 by the University of Texas at Austin, Title page, Copyright Page, pp. 5-100.

Sheinbein, D. et al. Stored Program Controlled Network: 800 Service Using SPC Network Capability, The Bell System Technical Journal, Sep. 1982, pp. 1737-1744 and Asmuth, R.L. et al. Transaction Capabilities for Network Services, 1985 IEEE, p. 312.

TARR Search on Storefinder trademark, Oct. 29, 2007, 2 pages.

Texas Advisory Commission on Intergovernmental Relations. Implementing 9-1-1 Systems in Texas: Legal and Institutional Background, Jun. 1987, 62 pages.

Trademark Electronic Search System (TESS) trademark record for STOREFINDER, Oct. 27, 2007, 2 pages.

Traffic Routing Administration (TRA) North American Numbering Plan, Routing Data Base System (RDBS) Products, date unknown, 3 pages.

VoicePro, Inc. The "One-Number System", undated, 1 page.

Wallace, Bob. Domino's delivers using new call routing services, Network World, Inc., Aug. 21, 1991, 2 pages.

Workman, Alexandra M. et al. International Applications of AT&T's Intelligent Network Platforms, AT&T Technical Journal, Summer 1991, pp. 44-57.

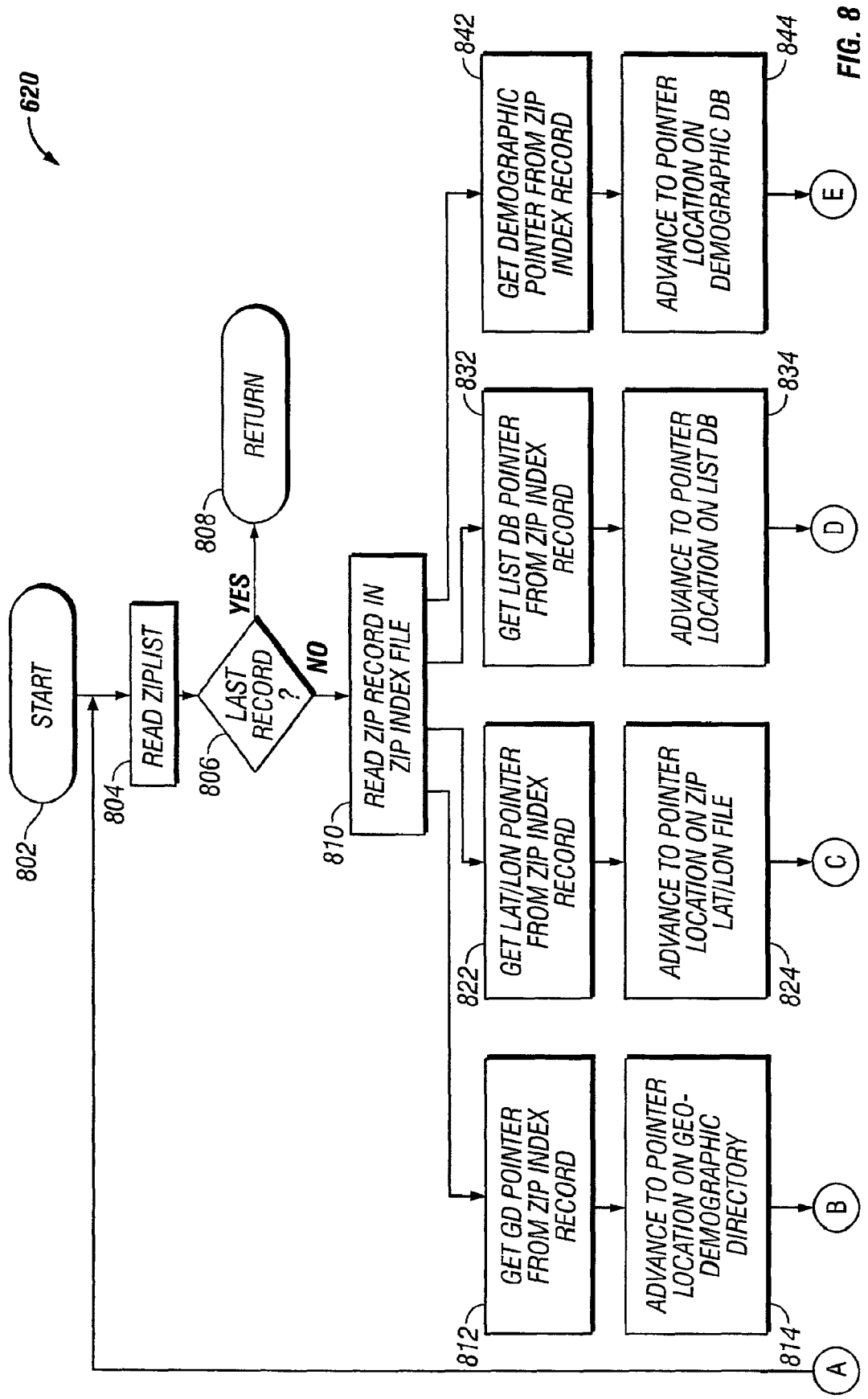

REAL-TIME PROCESS FOR DEFINING, PROCESSING AND DELIVERING A HIGHLY CUSTOMIZED CONTACT LIST OVER A NETWORK

CROSS REFERENCE TO RELATED APPLICATIONS

This application is a Continuation of application Ser. No. 09/678,752, filed on Oct. 3, 2000 now U.S. Pat. No. 7,243,075, which is hereby incorporated by reference.

BACKGROUND OF THE INVENTION

1. Field of the Invention

Aspects of the present invention generally relate to the real-time definition, processing and delivery of contact address lists over a network. More particularly, embodiments of the present invention relate to selecting contact records for any geography of any size or shape that have a propensity to consume a specific product or service, and delivering these records with selected information appended, such as a contact name and a consumption propensity score, in a real-time environment over a public network such as the Internet.

2. Description of the Related Technology

Traditionally, the process of selecting and extracting records from a national contact list of 100 million plus records was limited to batch processes on large mainframe computers housed at companies such as ACXIOM, MetroMail and Polk. These lists were mainly used for direct marketing applications such as direct mail and telemarketing. These historical tape-oriented databases contained large records. They were typically several hundred bytes in size and contained separate fields for name, contact addresses: (USPS mailing address, city, state, ZIP code; telephone number, e-mail address, etc.) and various levels of geography, household and individual attribute data like age, income, presence of children, etc., as well as other data like geodemographic codes and composite social economic scores.

Based on the extremely large size of the database and sequential processing requirements, the definition of list selects and appends involved multiple people and took several days, since processing was usually organized around a large weekly batch run that processed all pending orders. The resultant list was usually only available on magnetic media such as nine-track tape that was then mailed or delivered by courier to the mail fulfillment house.

Custom geography selects like radius and polygons were not available. This factor, in conjunction with the long turn-around times, limited the usefulness of these lists for non-direct marketing contact applications like public safety notification of toxic spills, etc.

Product scoring models were limited to large mailers like Readers Digest that could afford to build a custom usage model using the attribute data on these files as independent variables. The list provider would then program this model and use it in the list select process. The building and programming of these models was usually a multi-month process and was a minimum of several hundred thousand dollars in costs.

In the mid 1990's, a CD based product called "Pro CD" made available key-entered data from the national white pages. Pro CD packaged and marketed the resulting database on eight regional CD-ROMs in retail computer stores, like Comp USA, for approximately $100 for both the software and the data. Initially, the software was primarily oriented to directory assistance applications. When the user typed in a name and city, the product would return a list of names, address and phone numbers. Later generations of the product had the address records United States Postal Service (USPS) ZIP coded, appended 5-digit ZIP code latitude and longitudes coordinates, and provided easy to use mailing and telephone number list select and extract software. The software supported geography selects such as State, NPA, NPANXX, City Name, ZIP code or an approximate radius around a selected record in the database. All the records for the same 5-digit zip code were assigned the same latitude and longitude coordinate, which made it easier to select a large radius like 25 miles rather than having to provide a large list of zip codes. There was no ability to assign a particular latitude and longitude and then generate records around this latitude and latitude point. This lack of geographic precision eliminated applications like direct mail to custom pizza store delivery polygons or mailing to high potential Digital Subscriber Line (DSL) customers with a high propensity to own a computer that live more than 2.5 miles from their telephone switch. DSL connectivity is currently limited to about 2.5 miles from a telephone company central office switch.

The contact list functionality and quality of the Pro CD product was limited by four factors. The first was that telephone book addresses are generally incomplete since many listings contain only a name and no address, secondary addresses like apartment number are rarely provided, and it is a difficult process to accurately translate a 7-digit telephone number and a partial street address and determine the correct NPA (area code) and city. These white page address deficiencies result in a mailing list with poor USPS deliverability as well as a deliverable list with very sparse coverage. A USPS mail deliverable contact list is a list where all the records are deliverable by the USPS to the addresses shown on the list. The second limitation was that there was no attribute date on the database to perform any meaningful selects. The third factor was the white pages for a given directory are published only once a year and about twenty percent of telephone listing change every year, which means that many records on the database are out of date. This high rate of white page listing changes coupled with the previously described correct NPA assignment issues and a large number of NPA splits occurring after the white pages were printed also made the quality of telemarketing or telephone number contact lists generated by the product somewhat less than desirable. The fourth factor is it is a messy and time consuming process required to manage an eight CD-ROM database on a PC that normally only has a single CD-ROM drive.

In the last few years, the major contact list suppliers like ACXIOM, MetroMail and Polk have made significant improvements in their database quality, depth of data and have migrated many of their databases from tape to disk storage. They have also provided electronic specification interfaces to their large customers to perform online counts. The method of performing these counts is usually from pre-stored geography summary tables. This method works well as long as the number combinations of geography and selecting or screening data is restricted to a finite number of permutations. However, the nearly infinite number of possible permutations using geography definitions of any area of any size and shape as well as product scores on thousands of products that are Geography, Household and Individual (GHI) data dependent, which require real-time computation, makes this method of pre-stored tables impractical.

Currently, there are web sites that provide some type of Internet based direct marketing list definition, ordering and delivery. However, none of the following Web sites: DataBy-Acxiom.com; InfoUSA.com; MyProspects.com; QMSoft-.com; ThinkDirectMarketing.com; Ira-OnDemand.com or ListsNow.com provide anything close to the meeting the current industry needs. None of the above Web sites provide a mapping interface to provide an easy way to define and process custom geographic areas of any size or shape. None of the above web sites provide a way for scoring individual records in a list based on the consumption of a specific product or service. None of the web sites provide results in real-time and pushes the results to a user-specified node. None of the web sites provide a way to store a customized service area around a set of stores and permit the user to go back at a later time and generate a fresh new list for a selected set of stores without having to re-specify the service location geographic area and select criteria.

There is currently a definite need in the industry to provide a nearly 100% contactable, multi-application list in a real-time environment over a network. More specifically, there is a need for a user, using an interactive detailed street map as a reference, to easily specify a geographically defined trade area of any size or shape, select a consumption score above a cutoff value from a database containing several thousand product/services scores, select from a rich list of additional data from which they want to select or append, and have the resultant list returned to a network node of their choice within a few seconds after they approve the specifications, counts, and costs. In addition, there is a need for a multi-location user that does a monthly direct marketing campaign like a pizza chain doing a direct mailing around their stores, to define their polygon service areas using the above tools and save their select, append and geographic definitions. For their periodic mailing, they could generate a new fresh list for each store by simply selecting the store's saved mail specification record of the stores for which they want to do the mailing.

Such a system would allow the user to interface to the real-time contact list system over a secure public network with either a browser or a customized applet embedded into another application running on a client device.

SUMMARY OF THE INVENTION

In one aspect of the invention, there is a computerized real-time, interactive method of building a list of contact records based on selected criteria, the method comprising obtaining a geographic area definition, a classification and a threshold value associated with the classification, generating a search geography code list of geography codes based on the geographic area definition, determining a selected set of records in a list database based on the geography codes in the search geography code list, identifying a spatial coordinate and a socio-economic code corresponding to a sub-geography code for each record in the selected set of records, identifying a classification score for each record in the selected set of records based on the socio-economic code, and determining identified records in the selected set of records based on a comparison of the classification score with the threshold value and if the spatial coordinate associated with the record is located within the geographic area definition.

In another aspect of the invention, there is a real-time, interactive method of building a contact list based on selected criteria, the method comprising permitting a user to interactively generate a list specification in real-time, transmitting the list specification over a network to a server having a memory, and building a contact list on the server in real-time based on the list specification, wherein the contact list comprises a plurality of records.

In another aspect of the invention, there is a real-time, interactive method of building a contact list based on selected criteria, the method comprising interactively generating a list specification in real-time, and building a contact list on a server in real-time based on the list specification record.

In another aspect of the invention, there is a real-time, interactive method of building a contact list on a computer network based on selected criteria, the method comprising interactively generating a list specification in real-time, comprising interactively specifying a geographically defined area for which a contact list is desired including receiving user input, and interactively selecting a product from a plurality of products and a threshold score for the product including receiving user input; transmitting the list specification over the computer network to a server having a memory; building the contact list on the server in real-time based on the list specification; and transmitting the contact list to a user-specified node on the computer network if one or more characteristics of the contact list are approved by a user.

In another aspect of the invention, there is a system for interactively generating a contact list in real-time based on selected criteria, the system comprising a server connected to a network, means for interactively generating a list specification in real-time, means for transmitting the list specification to the server via the network, means for building a contact list on the server in real-time based on the list specification, and means for transmitting the contact list to a user-specified node on the network if one or more characteristics of the contact list are approved by a user.

In yet another aspect of the invention, there is a computer system for interactively building a contact list in real-time based on selected criteria, the system comprising a user specification process module configured to receive user input so as to interactively generate a list specification in real-time, a geography list process module configured to receive the list specification and to generate a list of selected geography codes in real-time based on the list specification, a list select and data append process module configured to generate an intermediate list in real-time based on the list of selected geography codes and the list specification, and a contact item lookup process module configured to build a contact list in real-time based on the intermediate list.

DETAILED DESCRIPTION OF THE PREFERRED EMBODIMENTS

The following detailed description presents a description of certain specific embodiments of the present invention. However, the present invention may be embodied in a multitude of different ways as defined and covered by the claims. In this description, reference is made to the drawings wherein like parts are designated with like numerals throughout.

Figure 1:
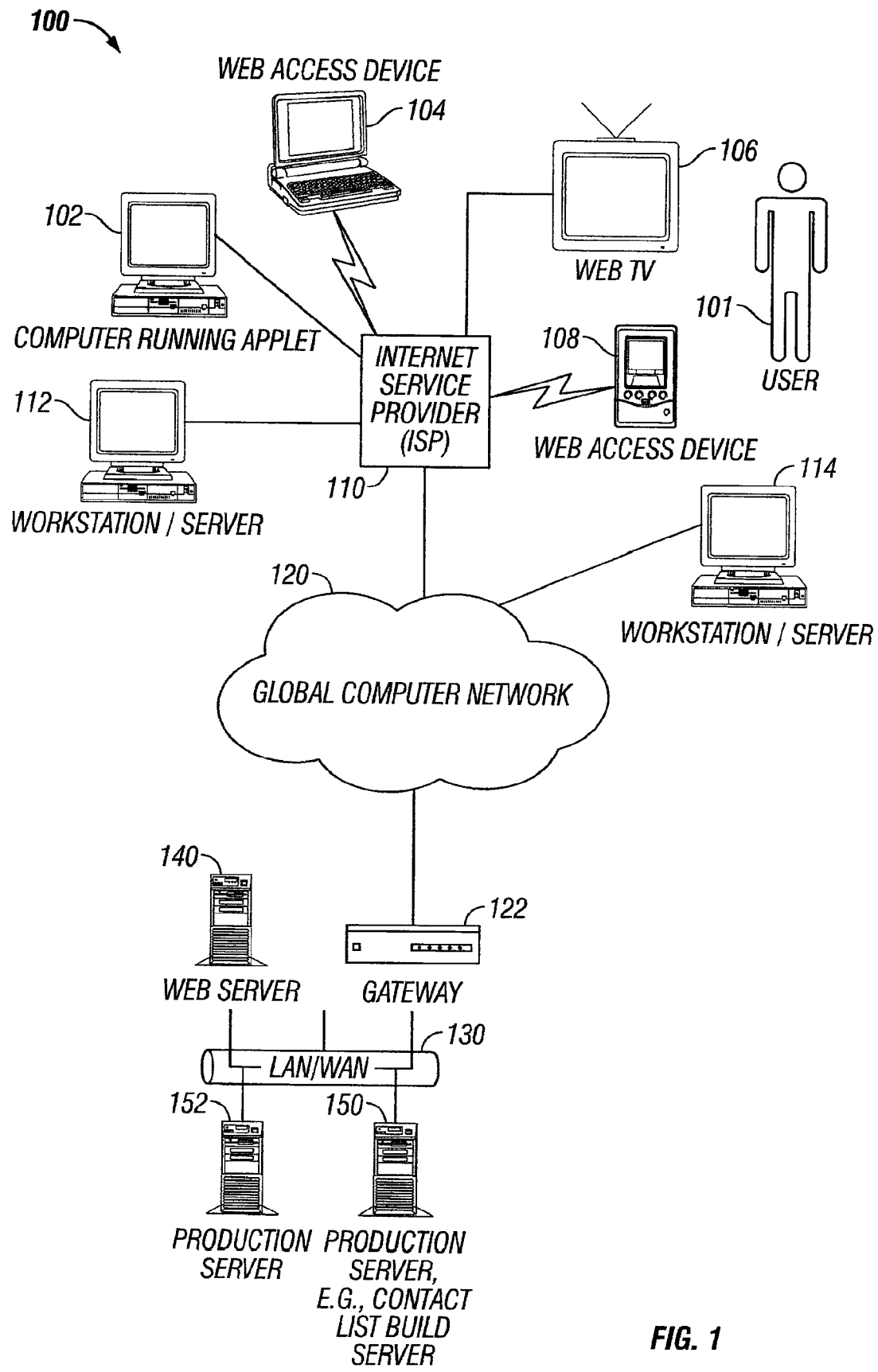
FIG. 1 is a block diagram of a network for interactive, on-line generation of contact lists of the present invention.

Referring to FIG. 1, an exemplary network configuration 100 used by the present invention will be described. A user 101 communicates with a computing environment that may include multiple server computers or a single server computer in a client/server relationship on a computer network 120, such as the Internet. In a single server configuration, a web server 140 may include the capabilities of a production server 150, such as a contact list build server. Alternatively, the web server may communicate with one or more production servers, such as production servers 150 and 152, via a local area network (LAN) or a wide area network (WAN) 130. The server computers may be connected via the network 130 to a network gateway 122, which provides access to the network 130 via a high-speed, dedicated data circuit, for example.

In a client/server environment, the web server computer 140 includes a server program, which communicates with one or more client interface devices 102-108. In one embodiment, the client devices 102-108 (which may be referred to as nodes) connect to the computer network 120 through one or more Internet Service Providers (ISPs), such as ISP 110. ISPs are also called Internet Access Providers (IAPs). The ISP 110 may provide Internet access to individual users and/or provide a direct connection from a company's networks to the Internet.

The client devices may include a personal computer 102 running an applet, such as a Java applet. Alternatively, the personal computer 102 may be running a browser program such as described below. A portable or mobile computer 104 may communicate with the ISP 110 with a modem or with a wireless connection interface device. Other client devices include a Web TV device 106 or a handheld access device 108, such as a personal digital assistant (PDA) or a mobile telephone with the capability of Internet connectivity. For high volume users, a workstation (or server) 112 may communicate through the ISP 110 directly to one or more production servers 150/152 using a Remote Procedure Call (RPC) or socket interface via the Internet IP network. Alternatively, a workstation (or server) 114 may bypass the ISP 110 by connecting directly to the Internet via a backbone provider, for example. Workstations 112 or 114 do not need to use the hypertext transfer protocol (HTTP) and may bypass the use of the web server 140.

Yet other hardware configurations may be used to communicate with the server computers. If the web server computer 140 is equipped with voice recognition or DTMF hardware, the user 101 could communicate with the server program by use of a telephone. The server would then provide information to the user or receive from the user so as to interactively generate a contact list via the telephone. Other connection devices for communicating with the server computers may include, for example, a cable interface device connected to a visual display, or a satellite dish connected to a satellite receiver and a television. For convenience of description, each of the above hardware configurations is included within the definition of the client devices. Other alternative ways of allowing communication between the user 101 and the server computers may also be employed.

The server computers 140, 150, 152 and the client devices 102-108 may each have any conventional general purpose single- or multi-chip microprocessor such as a Pentium® processor (e.g., Pro, II, III), an AMD Pentium class or better processor, a 8051 processor, a MIPS® processor, a Sun SPARC2 or UltraSPARC2 processor, a Power PC® processor, or an ALPHA® processor. In addition, the microprocessor may be any conventional special purpose microprocessor such as a digital signal processor or a graphics processor. Furthermore, the server computers and the client devices may be desktop, server, portable, hand-held, set-top, or any other desired type of configuration. Furthermore, the server computers and the client devices each may be used in connection with various operating systems such as: UNIX, LINUX, Solaris, Disk Operating System (DOS), VxWorks, PalmOS, OS/2, Windows 3.X, Windows 95, Windows 98, Windows CE, Windows NT, or Windows 2000.

The server computers and the client devices may each include a network terminal equipped with a video display, keyboard and pointing device. In one embodiment of the network configuration 100, the client devices may include a network browser that is used to access the web server computer 140. In one embodiment of the invention, the network browser is the Internet Explorer, licensed by Microsoft Inc. of Redmond, Wash. The browser may include a graphical user interface to facilitate communication with the user, such as to display information to the user or request information from the user, so as to interactively generate the contact list. In other embodiments, other user interfaces may be utilized to communicate with the user.

The user 101 at one of the client devices 102-108 may utilize the browser to remotely access the web server program using a keyboard and/or pointing device and a visual display, such as a monitor. It is noted that although only several client devices are shown in FIG. 1, the network configuration 100 can include hundreds of thousands, or more, of client computers.

The processors of the servers and/or client devices execute software and operate on databases, files, tables, lists and the like. The software may include processes, functions, procedures and the like, which may be represented by blocks or states in the subsequent figures. The terms module and process are used herein to refer to software and/or processors operating under control of software to perform defined functions or tasks. The functions, processes, and so forth can be divided or partitioned in many ways and may be performed by a processor under control of software instructions.

The network 120 may include any type of electronically connected group of computers including, for instance, the following networks: a virtual private network, a public Internet, a private Internet, a secure Internet, a private network, a public network, a value-added network, an intranet, and the like. In addition, the connectivity to the network may be, for example, by remote dialup modem, cable modem, Digital Subscriber Line (DSL), ISDN, Ti, Ethernet (IEEE 802.3), Token Ring (IEEE 802.5), Fiber Distributed Datalink Interface (FDDI) or Asynchronous Transfer Mode (ATM). The network 120 may connect to the client device 102, for example, by use of a modem or by use of a network interface card that resides in the client computer 102.

Figure 2:
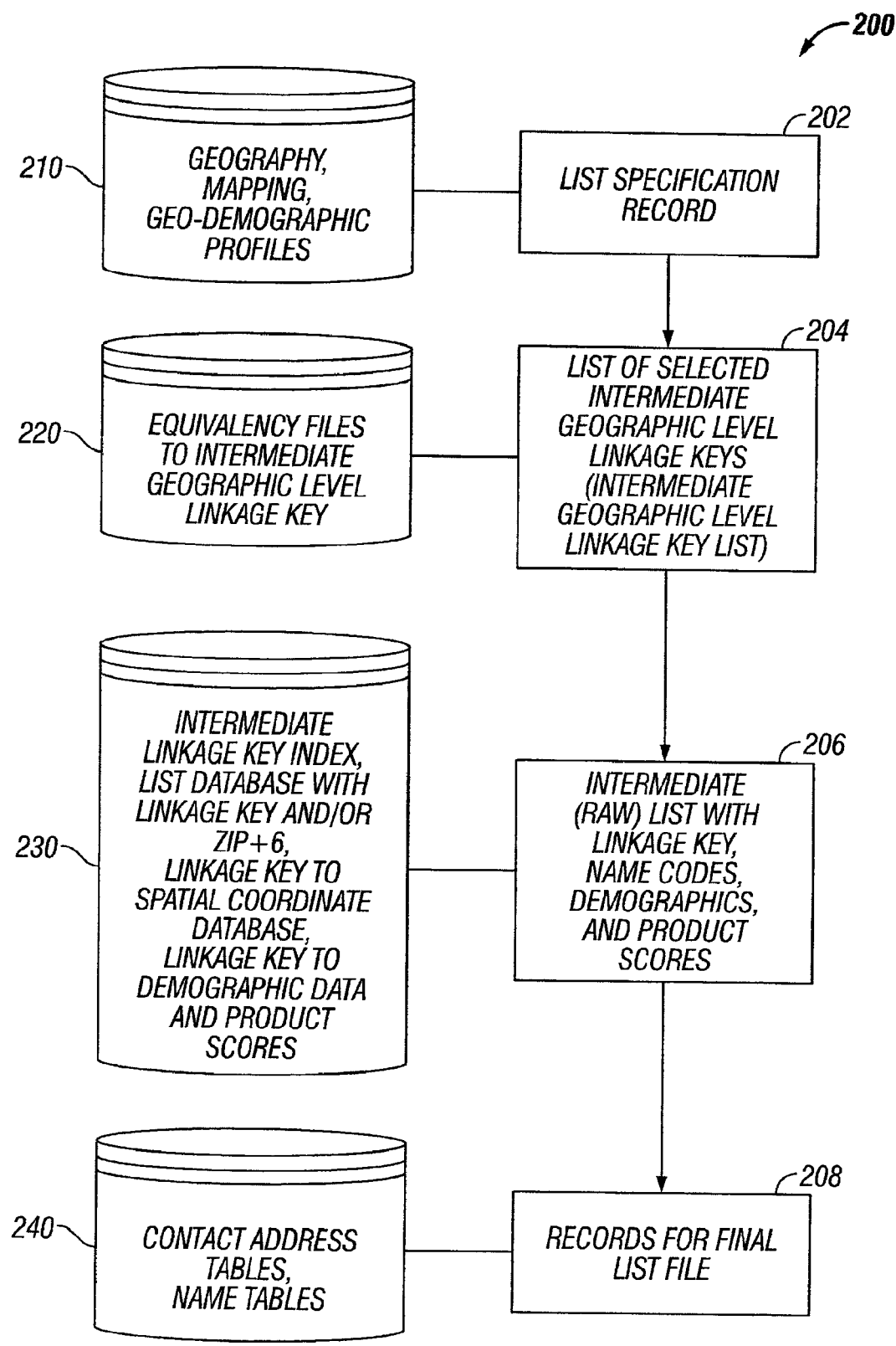
FIG. 2 is a block diagram of databases, files, or tables and lists utilized in the interactive, on-line generation of contact lists.

Referring to FIG. 2, a high-level block diagram 200 of the major database and process components of the present invention will be described. The blocks or elements of FIG. 2 may represent databases and results such as lists or files. The blocks of subsequent figures may also represent processes, functions, procedures, calculations, subroutines, and the like.

Block 202 represents the results of a specification process of specifying the requirements for a contact list. These results are referred to as a list specification record. In one embodiment, this involves several components that fall into four primary categories: screening/selecting, appending, formatting and delivery specification.

Screening/selection can also be further divided into major subcategories: spatial geography, product/service consumption values/scores, geography/household/individual (GHI) attributes, address types and data quality. Examples of spatial geography screening are selecting records located: within an irregular shaped polygon; within a defined radial distance around a specified address, intersection, latitude and longitude defined point; or within a list of standard geographies like zip codes, DMAs (Dominant Marketing Areas), cities, places, counties, states, NPAs (Area Codes), MCDs (Minor Civil Divisions), MSAs (Metropolitan Statistical Areas), congressional districts, voting precincts, school districts, etc.

In terms of product/service consumption, there are many ways to implement this screening and/or append feature. Note that the term "product" may be used hereafter to refer to a product, a good, a service, or the like. The product may be identified by a classification and may refer to a class of goods, a particular good, a specific brand, and so forth. Examples of three of the common consumption screening methods for consumer lists are regression models based on individual, household or geographic data; neural network models; and panel consumption data used in conjunction with an individual, household or geography based segmentation system. Examples of consumer segmentation systems are MicroVision, LifeP$YCLE, PRIZM, and P$YCLE by Claritas; ACORN by CACI; The Life Style Selector by Polk; Mosaic, Insource and Niches by Experian; Solo and Portrait by TransUnion; etc. In business/government list applications, the same consumption screening methods apply; however, the key discriminatory data in one embodiment is a combination of SIC (Standard Industrial Classification), SOC (Standard Occupational Classification) distributions by SIC and number of employees at a location.

Geography/Household/Individual (GHI) screening is usually based on demographic characteristics at one or more of the GHI levels: examples are age, income, marital status, own/rent, gender, race, property value, age of children, presence of children, education level, occupation, age of dwelling units in area, type of automobiles owned, boat ownership, and the AMA "do not mail to" flag, etc. Again, business/government screening is usually based on some combination of SIC, SOC and number of employees.

Address type is obviously a function of the type of contact address: U.S. mailing address, telephone number, etc. For a U.S. mailing address, the valid USPS (United States Postal Service) address types are Firm, High-rise (Multi-unit), Single unit, RR or HC Box, PO Box and General Delivery, while Telcordia currently classifies telephone phone types as Plain Old Telephone Service (POTS), pager, cellular, PCS, Mobile, Marine Mobile, etc. Data quality screening relates to records that are missing some key quality component. A non-inclusive list of examples includes records without a name, records with a missing address component such as apartment number or telephone numbers without an area code, records with a missing screening/append attribute component, and records that have an old confirmation date.

In general, the data that can be appended in a contact list is substantially similar to the data that can be used to select from. However, some of the data available for selecting may be suppressed from appending to protect consumer privacy. Application specific examples include non-published telephone numbers, e-mail addresses, children's names and ages and income. There are also behind-the-scene data elements that can be appended, but do not make sense to be selected in their raw form. Examples of common appended variables of this type are latitude and longitude or other small area geographies like MCDs, census tracts, block groups or blocks, as well as the distance and direction from a retail location to a detail record's address for records that are inside a selected radius or polygon.

Formatting specifications fall into several levels or areas such as mixed case or all capital letter mailing addresses, whether the first address line of a mailing address should be a single field or whether there should be separate fields for building number, pre-direction, street name, street type, post direction, secondary address type and secondary address number. The next level of formatting is the file type: whether it should be a fixed field text file terminated by a Windows CR-LF or a UNIX new line, an ASCII delimited record file, an application specific file like a native Microsoft Access or Excel file or an XML (Extended Markup Language) stream, etc. The next level of formatting relates to sending the file in raw form or compressing it with a compression utility like PKZIP.

The final level of delivery specification relates to the address to which the list could be delivered electronically. Options include one or more of the following: a user's browser, a file on a user's hard drive, a user's e-mail address, a third party e-mail address, IP address, URL or a FTP site. The above are all classified as "put" options. There are also "pull" options where, upon list completion, a notification process e-mails the file, statistics and costs to an e-mail address that includes the FTP site and password from which the full list can be retrieved.

Databases 210 include the data sets utilized by the specification process to generate the list specification record 202 to provide a user-friendly environment for specification. The data sets contain a list of geography types with each geography type containing a list of geographies identified by both a code and a name. Examples of the geography types are listed in the section related to the record 202 above. For example, there are 3141 counties in the United States and the county list contains the counties in alphabetic name order by state. In one embodiment, the code is the FIPS (Federal Information Processing Standard) 2-digit state code followed by the 3-digit county code. For example, San Diego County, Calif. has a FIPS code of 06073.

When a custom geography is required, databases 210 fulfill this requirement for record 202 with detail street mapping and address latitude and longitude coding databases and database access tools. The original source of these mapping databases is usually some combination of the 1990 Census TIGER files and the USPS AMS address-coding guide in one embodiment. These files have been either enhanced or merged and enhanced by private companies like GDT (Geographic Data Technology), Navtech, or Etak. These enhanced databases are then utilized by software programs such as that from QMS (Qualitative Marketing Software), Mailers software.com and Group One for address latitude and longitude coding. This kernel level address coding functionality software and data is then embedded into map display software APIs (Application Program Interfaces) like those provided by MapQuest.com, ESRI, MapInfo and AutoCAD. These mapping software packages and application developer kits usually provide both a Java and a C++ API that allows an application developer to easily develop both Web and non-Web applications with both a mapping and address to latitude and longitude geo-coding user interface. Using these databases and tools, an application developer can provide a simple user interface that provides a user the ability, for example, to type in an address or intersection and have a detailed street map appear on their screen with the entered address or intersection displayed in the center of the map. The user can then easily enter a radius around this location or digitize a polygon that follows boundaries like streets, rivers or railroads.

In one embodiment, databases 210 also provide a list of products/services that can be scored by the system as mentioned above. The basis for these scores, as mentioned above, may be regression-based equations, neural network determined patterns or the integration of panel data from sources like MRI (MediaMark Research Inc), NPD (National Panel Data), Simmons, GDR Crest, etc., with a segmentation system like the ones mentioned above. In addition to product scores, databases 210 also provide a data dictionary that can be used by the application as a way of showing the user what data items are available for list select and append.

A list, such as a Zip Code list, of block 204 results from an equivalency process that takes the list specification record 202 and then uses databases 220 to build an intermediate list of linkage keys or linkage key parent keys. For example, if the linkage key is a ZIP+6, then valid linkage parent keys could be a 5-digit zip code, a ZIP+2 or a ZIP+4. The primary purpose of this process is to build a subset list of records to be searched in the master database, thus eliminating records from being searched that cannot possible meet the geographic select criteria.

Databases 220 are a set of geography translation files that are used in building the intermediate linkage key list 204. Two examples are a spatial coordinate, e.g., latitude and longitude, window to 5-digit zip code equivalency file, and a county to 5-digit zip code equivalency file. Note that spatial coordinates herein include entity pairs such as latitude and longitude, which may be interleaved as a single number. For example, when a user defines their geography select as a radius around an address or a digitized polygon around an address, there needs to be a way to translate these spatial definitions into a standard set of geography codes to reduce the number of candidate records that must be searched in the detailed record database. In a database with 140 million detail records, there are approximately 43,000 5-digit zip codes. A one-mile radius definition using the "latitude and longitude window to zip code equivalency file" will normally return a list of one to three 5-digit zip codes to search. This makes a search improvement of over 10,000 times when compared to searching all detail records in 43,000 zip codes sequentially, or using a secondary index and having to make many thousands of random disk accesses using convention relational databases with secondary indexes. The same type of search efficiency improvement can also be done for the county to zip code equivalency file mentioned above. The equivalency files are used to keep the detailed master record file in only one sequence so as to be able to process it in relatively small sequential, discrete disk or memory blocks by translating all geographic definitions to one common geographic definition consistent with the order of the detail record master databases.

A list of block 206 results from a select and append process that uses the linkage key list or parent linkage key list of block 204 in conjunction with other specification parameters originally defined in block 202 and inherited by block 204 to efficiently access databases 230. The select and append process then builds a raw list of all records that pass the specified selection criteria and appends all selected data items to each passing record. The process to generate the raw list 206 performs precision spatial screening as it determines if a detail record is located inside a radius or polygon or its county code matches one of the selected counties. Records that fail this test are not sent to the intermediate raw list file. The select and append process also screens out records that fail to pass product/service minimum/maximum score thresholds as well as performing all other screening and append functions defined above in conjunction with the record of block 202.

Databases 230 can be one database with many fields of data or multiple databases where each database only contains a few data fields and each database can be of a different linkage key precision within the same linkage key family. For example, in the later case, one database could be zip code (5-digit) based, another ZIP+4 based, another ZIP+6 based and one could be ZIP+6 based with name pointer codes. Historically, most direct marketing systems used a single database with many data fields, which typically included name, contact addresses (USPS mailing (billing and delivery), telephone number, facsimile number, electronic-mail, etc.), product scores, demographic variables and geography codes. This type of single database design is simplest to implement but has major shortcomings in terms of flexibility and processing speed. With the advent of faster computers having more computer memory, the multiple database design becomes more attractive. Computer RAM (Random Access Memory) provides approximately 10,000 times faster data access speeds than disk drives. Based on this performance ratio, a superior design in terms of processing speed and flexibility is to utilize multiple parallel linkage key sorted and indexed databases that utilize storage efficient pointers to other memory databases versus storing fully expanded records in a single file. For example, Frank N. Stansberry, 123 N Mount Wilson Blvd Apt 1202A, Little Rock, Ark., 12345-6789-12 can be stored in twelve binary bytes of linkage keys and pointers to other memory resident databases. The above storage efficiency used in conjunction with parent linkage key databases, like a ZIP+4 to latitude and longitude database, a MicroVision ZIP+4 Segment Directory and a fifty segment MicroVision product score table, provides a way to efficiently determine which of the twelve-byte detailed records are located within the specified geography definitions, as well as to determine which records have a high propensity to consume a specified product or service.

The multiple database design version of databases 230 also adds flexibility to the system by making each database related to all other databases based on the common linkage key hierarchy, yet remaining totally independent from one another. The following examples illustrate the flexibility and database independence of the multiple database design using a single hierarchical linkage key. A linkage key to spatial coordinate database, which may be the ZIP+4 to latitude and longitude database, could be replaced with a ZIP+6 latitude and longitude database; additional MicroVision Scores tables could be added without impacting any existing databases; segmentation systems and their dependent products scores tables could be interchanged; additional demographic variable databases could be added at any level of geography supported by the linkage key, etc.

The records of block 208 result from a lookup process that utilizes the intermediate raw list 206 and databases 240 to generate a full name and address (or other contact items) record from which the process builds the final record containing a name and address as well as selected append data to the format specified by the user in the list specification record 202. In one embodiment, the final records form a mailing list. In another embodiment, fields or items other than name and/ or physical address may be utilized for the final records, and these records may form a contact list or other type of list. If a single or fully expanded record multiple database design was used in databases 230, then the lookup process and databases 240 would not be required. In one embodiment, the method used by the lookup process to generate fully expanded name and address records is extremely fast since all records from databases 240 are stored in computer memory.

The lookup process includes processes that are conceptually identical for expanding names and addresses. However, the address expansion process is a function of the contact address type and may involve a few additional tables. In order to simplify the description, only the name expansion process is discussed herein. The intermediate raw list file 206 contains three pointers stored as binary numbers: a last name pointer, a first name pointer and a middle initial pointer. These pointer values, illustrated here as base 10 numbers, correspond to fixed size record sequence numbers loaded in three corresponding databases. For example, if the last name pointer value is 30,111, then the lookup process would retrieve record 30,111 or "O'Dell" from the last name memory resident database. This same simple process is used to retrieve the first name and middle initial creating a name like "John R O'Dell". In one embodiment, the retrieve name is in mixed case and contains special characters, like the apostrophe between the O and the D in "O'Dell". By storing the last name O'Dell only once for all the hundreds of thousands of instances of the last name O'Dell, the name can be stored and retrieved in the most common and desirable format. If a user specified to have names with all capital letters without any special characters, it is a simple computer conversion to convert "O'Dell" to "ODELL". However, if one stored the full name in databases 230 as "ODELL", there is no standard algorithm to convert "ODELL" and like names to the mixed case, most desirable format. This same process and process benefits also apply to business names as well as to the various types of contact addresses.

In a USPS mailing address contact list embodiment, databases 240 are created from three primary public sources: The United States Postal Service (USPS), The United States Census Bureau, and the National White pages. The USPS provides a monthly version of the AMS ZIP+4 address coding guide and the City State file. Using these files and indexing them by some hierarchical geographic component level of a ZIP code, an 11-digit zip code can be converted to a complete mailing address like "123 N Main St APT 3B, Portland Oreg.". The primary source of first and last names is that compiled by the United States Census Bureau for the 1990 Census and provided as a downloadable file from their web site. These Census Bureau names have been augmented by extracting and tabulating both first and last names from the commercially available national white pages provided by companies like ACXIOM Corporation. All names over a certain frequency that can be verified as a valid name are added to the master lists. This same process is used for compiling a master list of business/government names. This process also provides the ability to eliminate erroneous names from the master name databases and to do some error correction when the database pointers are created. For example, there are over 3,000 first names of "DAIVD" in the national white pages. This obvious typo is assigned the same pointer value as "David", so even though the source was wrong, the name generated by the lookup process for this record would be "David" and not "DAIVD". When the results of the 2000 Census are made available, the new information may be utilized in place of the 1990 data.

In another embodiment, the records of block 208 may contain names or portions of names (e.g., first name only) and telephone numbers, facsimile numbers, electronic addresses such as e-mail addresses, network addresses, universal resource locators (URLs), Internet Protocol (IP) addresses, pager numbers or other wireless device numbers corresponding to the names instead of names and addresses. In other embodiments, other data, such as telephone numbers, business identifier and telephone number, residence name and telephone number, electronic-mail address, IP address, URL and so forth may be listed in place of the names and addresses.

The above description of FIG. 2 discusses one embodiment of this invention utilizing currently available technology. This process involves selecting records from a universe of over 100 million records and delivering, in a single network session, a multi-application contact list containing many thousands of records with selected data appended that has been screened to be within a geography of any size and shape and/or optionally screened for a propensity to consume or use a specific product or service. The embodiment described above uses multiple compact databases with pointers and a universal linkage key using a Postal 11-digit zip code with name pointers, as an example, to associate matching records in different databases with different geographical hierarchical levels of precision. With the rapid development in computer memory, processing speed, and overall computer technology, one skilled in the art may be able, at some point in the future, to accomplish the above novel functionality using either a different universal linkage key and/or a more classical single database design for list applications other than classical direct mail. For example, the linkage key could be a telephone number, census block number, network logical address like an e-mail address, network physical address like an IP address, interleaved coordinate pair like a latitude and longitude, etc. In the case of the IP address, the ZIP+4 to lat/lon tables would be replaced with an IP address to current location lat/lon table and the ZIP+4 to geodemographic table would be replace by an IP address to geodemographic table. Using the above embodiment, a retailer could utilize the system to generate a list of potential customers currently located within a two mile radius around the retailer's store that have a high propensity for purchasing a product that the retailer just put on sale. Immediately upon receipt of the list, the retailer could broadcast an instant message to all list record addresses that have their fixed location or mobile IP device set to accept such messages. This same type of process could be used by a public safety organization to notify a list of people down-wind of a toxic chemical spill, for example. One can see from the above examples, the near instant availability of custom contact lists for geographies of any size or shape with optional screening used in conjunction with existing list merge/purge technology and developing network broadcast technologies makes many new applications possible.

The description of FIG. 2 as described above relates primarily to specifying and generating a single, one-time list for a geography of any size or shape. FIG. 2 also illustrates the processes used by a multi-location retailer to specify each location only once and then periodically generate new updated lists around each specified location using the saved specifications. Referring to FIG. 2, the multi-locations process works as follows. For each location, the user only performs the specification steps described above for databases 210 and record 202 and saves the specification record to a list specification record 202 that includes a location name or identification (ID). In one embodiment, these individual location specification records 202 are saved on the user's hard drive or in a password secured directory on the web server 140. When the user wants to generate a new list for one or more of these records, they simple click on the specification record. This brings up three options: edit, count or process without count approval. The edit option provides the user with a way to modify the specifications of a record as described above in conjunction with databases 210/record 202, and save the new specifications. The "count" option performs the functions as described above in conjunction with databases 220/list 204 and databases 230/list 206 and then provides the option to perform the operations associated with databases 240 to build the final list 208. The "process without count approval" option preferably performs all the functions described above in conjunction with databases 220/list 204, databases 230/list 206 and databases 240/list 208 without prompting the user for count acceptance at the end of generating the intermediate list 206. Since the lists are not being processed at the user's input device, the user can select the "process without count approval" option on one location list specification record and then immediately click on another location specification record. This process is repeated until all desired location specification records have been submitted for final list processing.

Figure 3:
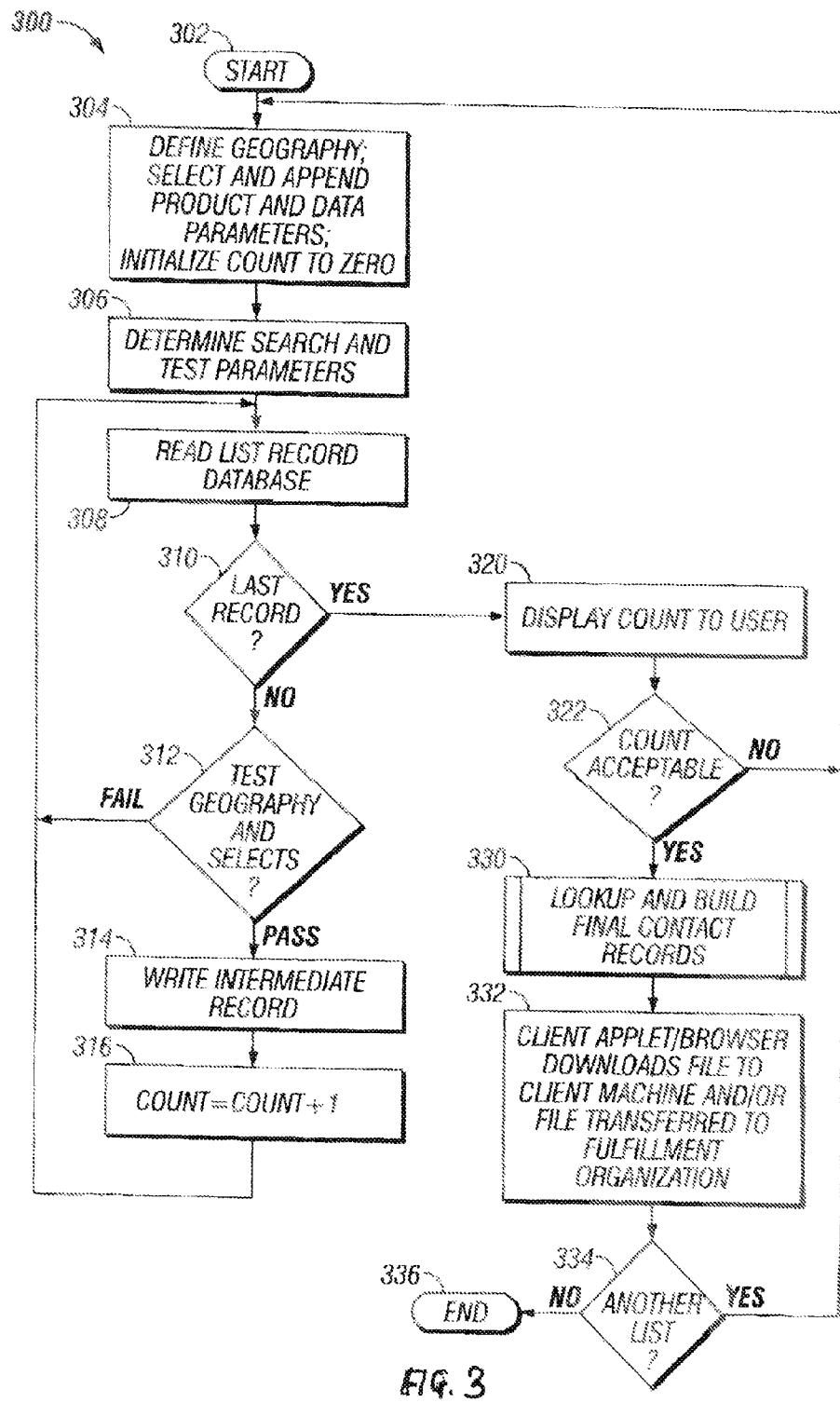
FIG. 3 is a flowchart of a process for generating contact lists corresponding to the structures defined in FIG. 2.

Referring to FIG. 3, a high-level block diagram of the process flow components of the present invention will be described. The process flow components may be implemented using the configuration of hardware and software elements described in conjunction with FIG. 1. State 302 represents the start of a process 300 for specifying and building a contact list in real-time with interaction from a user. Process 300 does not show or mention any billing mechanism. Since there are numerous methods described in the current art for billing on an account or via a credit card, these methods will not be described here, as the current invention does not require a novel method of billing.

State 304 represents a specification and initialization procedure. This procedure involves specifying the list requirements in terms of geography, data and product scores to be screened on and appended, output formatting and delivery methods. This procedure of state 304 also sets the initial list count to zero.

State 306 is an extension of state 304 and one skilled in the art could convert these to a single state by combining states 304 and 306. State 304 relates more to a user-friendly interface specification, while state 306 acts as a translator layer between the user and a computer interface. It takes the specifications in state 304 and the user's real-time computer accessible files to edit and convert the user specifications into a standard set of computer application parameters.

State 308 reads a record from the list databases 230. State 310 tests to see if this is the last record that needs to be read from databases 230. This decision state could include a simple end of file test or a maximum test record value to search as determined in the select and append process for generating the raw list 206. If decision state 310 determines the last record has been read, then process 300 continues with step 320, or else it goes to a decision state 312. Decision state 312 uses the specifications from state 306 to determine if the record passes or fails the various selection tests also defined in state 306. If decision state 312 fails, then process 300 returns to state 308 and reads the next record, or else if the decision state 312 passes, process 300 continues to state 314. At state 314, process 300 writes an intermediate record containing the data defined in state 306. Next, process 300 continues to state 316 and adds one to the passing record count. Upon completing this task, process 300 returns to state 308 to read the next record from databases 230.

State 320 indicates that all required records from databases 230 have been read. Process 300 displays the total count of passing records and other optional information, such as count by record type and costs to the user. Next process 300 proceeds to a decision state 322 where the user utilizes the information provided in state 320 to determine if they want to accept the list or not. If the list is not accepted by the user at decision state 322, then process 300 returns to state 304 and asks for a new set of user specifications. If the list is accepted by the user at decision state 322, process 300 moves to a process 330 to lookup and build the contact, e.g., name and address, component of the output record. When computers become faster with larger amounts of memory than the computers available today, one skilled in the art could eliminate process 330 by keeping the contact items such as name and address in databases 230 and writing the data out in state 314, thus eliminating the need to build the name and address in process 330. Upon completion of process 330, process 300 advances to state 332.

State 332 transmits the final list to location(s) specified by the user in state 304, such as a client machine or node, and/or to a fulfillment organization. The methods of moving data from one machine to another in a network are well known in the current art and the current invention does not require a novel method of performing this task. Upon completion of state 332, process 300 has completed the task of specifying and building a single contact list in real-time. The recipient of the final contact list may transmit or broadcast/multicast, in real-time, a message to electronic addresses listed in the final contact list. The message may be an e-mail message optionally containing a link to a web site on the Internet, for example. The recipient may be restricted to one of various usage levels for the contact list, such as read-only usage, one-time usage, or unlimited usage, which may be dependent on user billing.

Upon completion of state 332, process 300 moves to a decision state 334 to see if the user desires to specify and build another list. If the user answers yes, then process 300 returns to state 304 to begin again, or else if the user answers no, process 300 completes at an end state 336.

Figure 4:
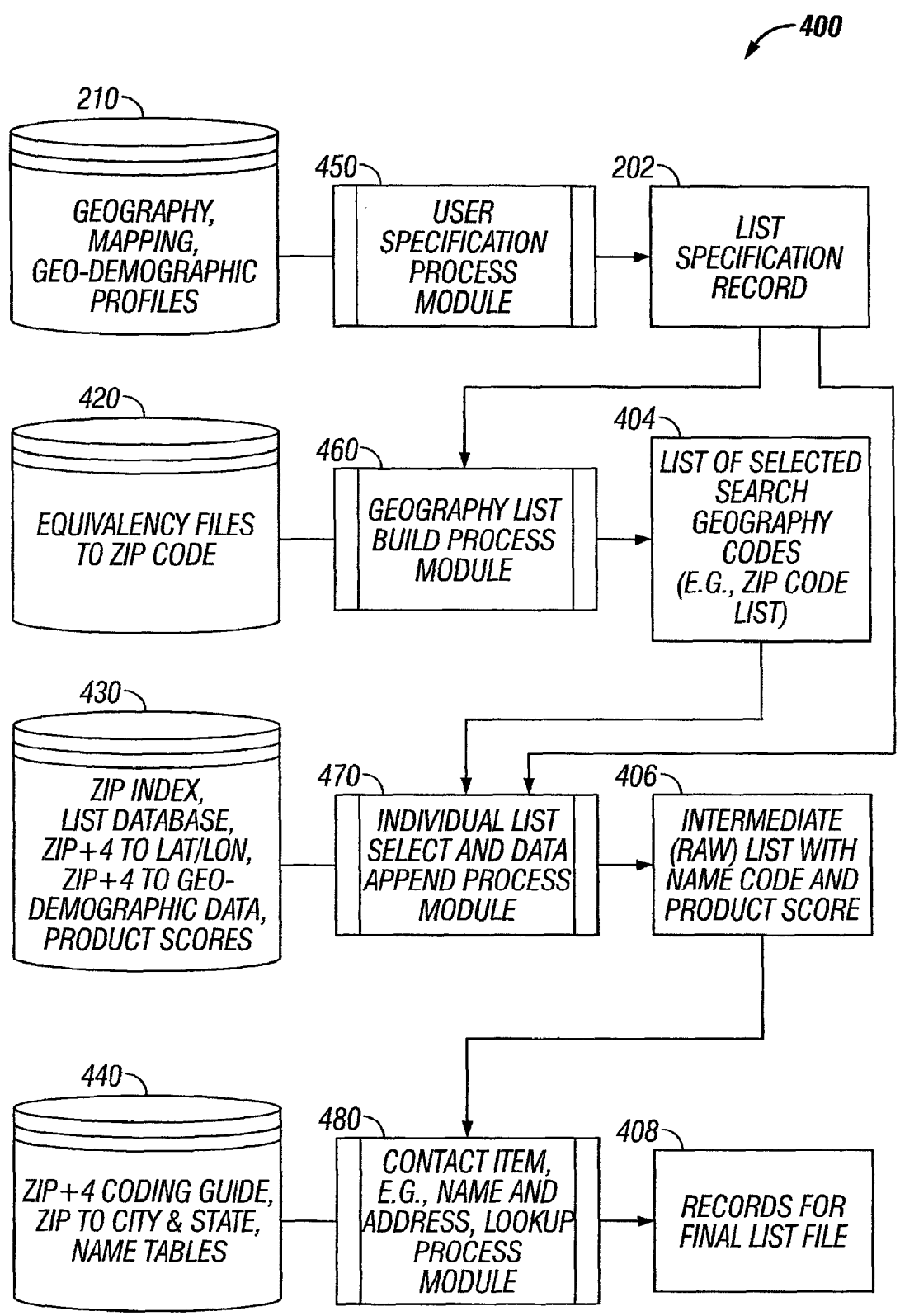
FIG. 4 is a block diagram of databases, files, or tables, processes and lists utilized in the interactive, on-line generation of contact lists.

Referring to FIG. 4, a mid-level block diagram 400 of the general implementation of database and process components will be described. FIG. 4 shows a more specific implementation than shown in FIG. 2. For simplicity of user understanding and to provide a user the ability to anonymously specify a custom list and see the cost before actually identifying themselves and purchasing, FIG. 4 is divided into four process modules. The modules include software that may perform a process, function, subroutine, calculation, procedure, steps executed by a computer, and so forth. The four modules are one exemplary way to partition the process flow of FIG. 3.

The first processing module is a User Specification Process module 450. Process module 450 provides a user with a simple and easy to use user interface that allows them to specify their list requirements. The data required for this specification is stored in the network databases 210 and the final set of specifications are written to the List Specification Record 202.

In one embodiment, the geography component of the specification for custom geographies, like radii around an address, intersection, or landmark and custom defined polygon areas (such as by using latitude and longitude vertices), may be defined by a mapping user interface that works over a network. A preferred mapping interface is the MapQuest mapping client/server software API that uses current GDT street and boundary files and QMS address standardization software. Standard geographies like ZIP codes, Counties, Cities, and so forth may either be selected from a map or from a named list either individually or as a group. For example, one could select the entire U.S. as a geography by selecting either Counties or ZIP codes, and could select all counties or ZIP codes by simply clicking on a "select all" option. A source for the geography named lists is Claritas Corporation.

A source for the product scores data component of the specification is also Claritas Corporation. Claritas currently provides MicroVision product scores for over 2000 products and services. Claritas can also build custom products and service MicroVision geo-demographic profiles using customer data. For easy specification, the profiles are grouped into meaningful categories, sub-categories and then into individual product or service profiles.

A source for the consumer demographic portion of the specification is ACXIOM Corporation. ACXIOM maintains a household and individual record database that contains demographic variables like presence of child or various ages, estimated household income, own or rent, length of time at address, etc. as well as individual characteristics like date of birth, gender and marital status, etc. A source of business and government demographic data is Claritas. Their Business Facts product has SIC, SOC distributions, number of employees and sales volumes for about 10 million business locations.

A second processing module is a Geography List Build Process module 460. Process module 460 reads the geographic segment portion of specification record 202 and uses the equivalency files 420 to create a List of Selected Search Geography Codes 404. A pre-existing geography code system is the Zip code system, which has several components or levels of hierarchy. Thus, the List of Selected Search Geography Codes 404 may be a Zip code list. There are two sources for the equivalency files that are geography dependent. For geographies that are contained in the USPS City/State file and/or the USPS ZIP+4 files, the USPS is a source of raw data from which the equivalency files 420 for these geographies can be built. For all other geographies, Claritas has created files in this format. Databases 220/list 204 in FIG. 2 are functionally similar to databases 420/list 404 in FIG. 4. Therefore, the information related to these databases/lists in the description of FIG. 2 also applies here.

A third processing module is the Individual List Select and Data Append Process module 470. Process module 470 does the following:

(1) Reads the List Specification Record 202 and the List of Selected Geography Codes 404 (e.g., Zip list) and determines which detailed databases 430 are required to fulfil the list requirements specified in Specification Record 202.

(2) Loops through the list of ZIP codes in the ZIP List 404 and for each ZIP code, reads in parallel all the records within the current ZIP code in the required detailed databases to determine which records pass all the specified screening criteria. Then retrieves or calculates all specified items to be appended, writes out an Intermediate Selected Raw List record to file 206/406 and increments the list record counters.

Upon completion of the two tasks above, the process module 470 presents contact list characteristics to the user, which in one embodiment include the list specification, the record counts and the costs of the specified list. The process module 470 then provides the option to either continue and purchase the list, or discard the current list and return to the specification module 450 and re-specify the list. In one embodiment, the user approves all the characteristics of the current list before purchasing the list, although the user can purchase the list by approving one or more or a set of the characteristics, if so desired.

In terms of databases 430, there are multiple database types. A name and address pointer list database is a multi-source PrecisionList.com compiled database. GDT is a source of a ZIP+4 to Latitude/Longitude (Lat/Lon) file. Claritas is a source for a Geo-Demographic Directory for a Geo-Demographic system (known as MicroVision) with its product profiles tables. ACXIOM is a consumer household and individual demographics database provider. Claritas is a business and government location demographics database provider. A ZIP Index database is built by PrecisionList.com from the individual databases listed above. Databases 230/list 206 in FIG. 2 are functionally similar to databases 430/list 406 in FIG. 4. Therefore, the information related to these databases/lists in the description of FIG. 2 also applies here.

The fourth and last processing module in FIG. 4 is the Contact Item Lookup Process module 480. In one embodiment, the process module 480 does the following:

(1) Reads the records in the Intermediate Raw List 406, looks up the corresponding names and addresses (or other items in other embodiments) in database 440, formats the output record according to the specifications in record 202 and writes the final formatted output record to the Final List file 408.

(2) Upon completing the Final List file 408, process module 480 either delivers file 408 to the location specified in record 202 or notifies the user and/or third party as to where to obtain (e.g., download) the file 408.

A source of the ZIP+4 Coding Guide and the ZIP to City/State tables is the USPS. A source of the Name files is the 1990 Census Name files that have been enhanced with names from the National business and consumer White pages provided by ACXIOM. Databases 240/list 208 in FIG. 2 are functionally similar to databases 440/list 408 in FIG. 4. Therefore, the information related to these databases/list in the description of FIG. 2 also applies here.

Figure 5:
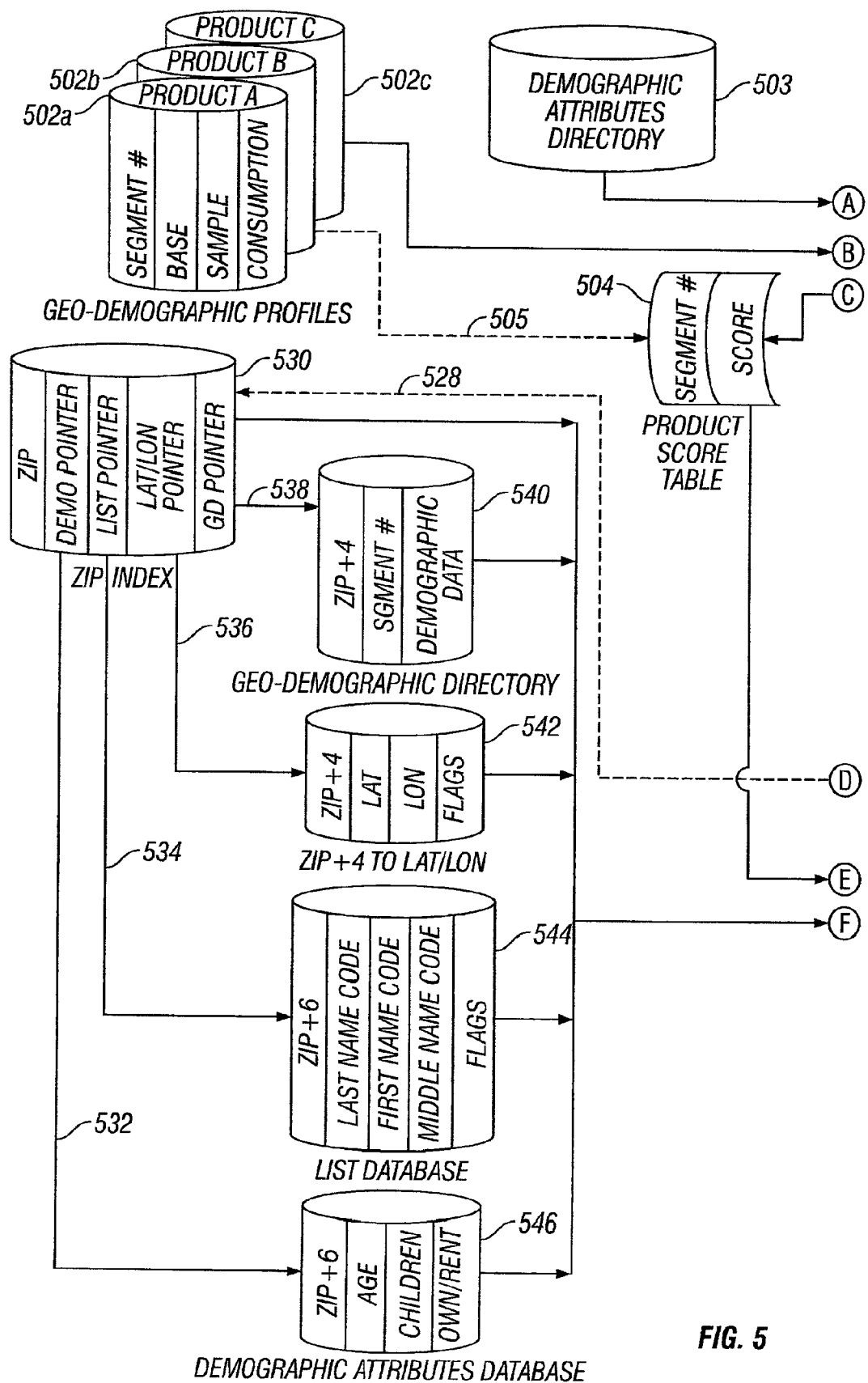
FIG. 5 is a diagram representing the relationships of the structures and processes of FIG. 4.
Figure 5:
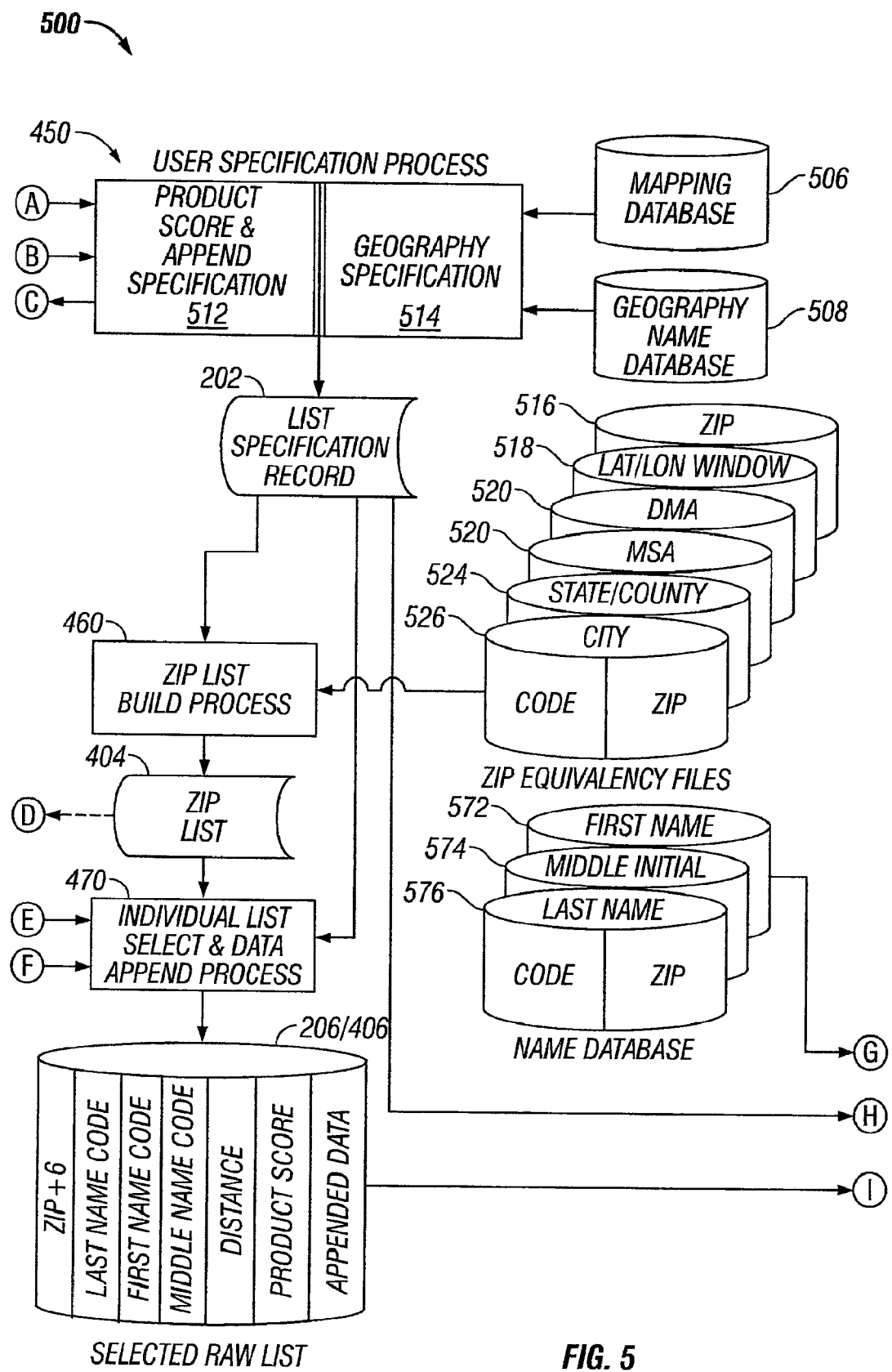
Figure 5:
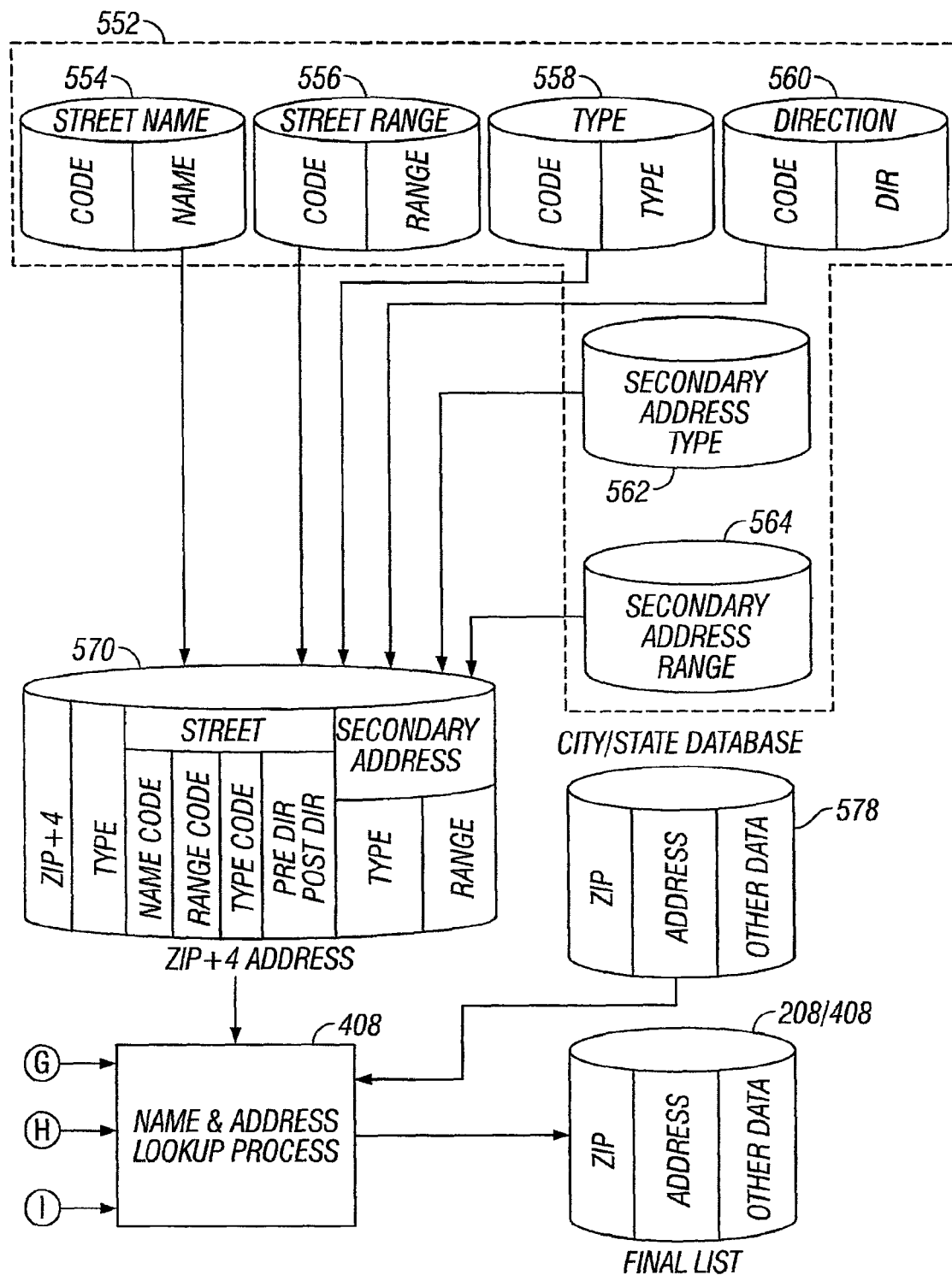

Referring to FIG. 5, an implementation of the database and process components 500 of the present invention that are used to build a Final List file 208/408 will be described. Process 450 comprises two component modules: 512 and 514.

Module 512 represents the process of specifying all the non-geography requirements for a direct marketing list. This involves several components that fall into four primary categories: screening/selecting, appending, formatting and delivery specification.

These components are described in general terms in conjunction with FIG. 2. The description corresponding with FIG. 2 also presents a host of alternative implementations. The following description of FIG. 5 revolves around using MicroVision geo-demographic data as a specific example for scoring, selecting on and/or appending specific product scoring consumption data to a list record. One skilled in the art could easily substitute a regression method or some other type of individual, household, business or small geography real-time segmentation scoring system.

Module 512 starts by displaying a list of products/services from which the user can select to either screen on or append. These products/services have supporting profiles stored in databases 502a, 502b, 502c . . . to 502n, etc., where information corresponding to one product/service is stored per database, in one embodiment. Presently, with MicroVision there are current profiles for over 2,000 products and services. In one embodiment, as shown in the databases 502, each of these profiles is stored in a MicroVision Profile (MVP) file that contains, for each of the fifty MicroVision segments, a segment number, base count, sample count and a consumption value. Other embodiments may have a different number of segments, for example. Not all profiles have a consumption value.

A segment is a group, where members of the same group are similar in terms of age, income, race, housing type and other social/economic characteristics. In terms of these group identification factors, the variation in characteristics between groups is much greater than the variation within groups. This intra-group consistency and inter-group variation is what makes segmentation systems discriminate across a variety of product and service usage and consumption patterns. In terms of a national, randomly distributed consumer panel of say 50,000 members, each of the panel members is classified into a single segment. The total count of panel members by segment is termed the base count. For a specific product, like current owners of a Certificate of Deposit (CD), the total by segment of members owning a CD is termed the sample count, while the average dollar amount of CD's owned per sample segment member is termed the segment consumption value.

Using at least one of the base count, sample count and consumption value as input, there are several different methods or equations that may be used to calculate a segment score. One equation for determining a score or index, the segment index score, is described below.

An individual segment index score (relative to an average score of 100) is determined by dividing the sample segment proportion by the base segment proportion and multiplying the result by one hundred. Both the base and sample segment proportions are determined by summing the segment counts independently for both the base and sample columns to get a total base and sample count. The sample and base segment proportions are then determined by dividing the individual segments counts in each column by their respective column total count. The score from this method results in an index based around 100, where 100 is average, while a segment score that is 200 is twice the average. The segment scores for the selected product(s) are stored in a product score table 504. Table 504 shows only a single product/service score for simplicity of illustration. However, multiple or a weighted combination of product scores could easily be supported.

One embodiment utilizes the MicroVision Geodemographic system. The Claritas Infomark User's Guide and Reference Manuals describe the MicroVision segments, base counts, sample counts, and consumption values in detail for various panel data sets. The Guide and Manuals also describe the various equations or methods that can be used to perform various mathematical computations of these values to generate various types of segment scores and indices. These manuals are hereby incorporated by reference. There are many other types of non-geography selects and appends and other specifications, like output formats and location, that are supported by module 512 and are well known in the direct marketing industry. Additional data that is available for selecting and appending is listed in a demographic attribute dictionary, which is a database 503. Most of these other types of general demographic selects and appends were previously described in the general description of FIG. 2 and will not be described again here.

Module 514 is the geography analog of module 512. Module 514 provides a way of defining a geography from which the list is to be extracted. There are basically two ways to specify geography at module 514: (1) via a spatial definition like a radius around an address/intersection or an irregular shaped polygon defined by coordinate vertices or (2) via a geography code or geography name. In one embodiment, a map is a basic requirement in order to easily define and validate geographies spatially. It is possible to accomplish this task without a map, but it may be much more difficult and may be prone to several types of errors. One embodiment uses mapping server software from MapQuest with underlying cartographic databases 506 and software from GDT and QMS. This software and the underlying databases 506 provide the tools to design a basic user interface that provides a way for a user to provide, e.g., type in, an address/intersection/landmark and see it plotted on a detailed street map. The user can then either define a radius or digitize a polygon service area around this visually verified point. It is also desirable to spatially define the following using a mapping interface: rings, quadrants, multiple non-contiguous polygons, polygons with holes or donuts, as well as definitions, like corridors, e.g., all records within 0.25 miles of a highway between points A and B.

Geography specification or definition in module 514 using codes and names is done using a geography name database 508, which contains a list of geography names and/or codes. Optionally, using the map database 506, a browser window may display these geographic areas as polygons with labels. In most cases, the list is preferred, as most people know the geography name they want, like San Diego, or the code, like zip code 92130. Module 514 provides the ability to select multiple geographies, like five zip codes, or geographies of different types, like a county plus two zip codes. It is also provides the ability to define a geography where a user specifies a geography, like a county but excluding two specific zip codes.

Upon completing both modules 512 and 514, process 500 proceeds to write the specification record 202. In one embodiment, this record contains all the user specifications for the list. There are numerous ways to store this information in the specification record 202. It is also possible to store these specifications in memory and not physically write out a file. If the records are not at some point written to disk, then the multi-unit retailer option described in conjunction with FIG. 2 may not be possible.

Next process 500 continues at process 460 and reads the list specification record 202. In one embodiment, process 460 builds a list of 5-digit zip codes to be searched. One embodiment for doing this utilizes geography (e.g., zip) equivalency files 516 to 526. The geography equivalency files may include a Zip file 516, a Lat/Lon Windows file 518, a DMA file 520, a MSA file 522, a State/County file 524, and a City file 526. In general, each of these equivalency files has a set of records, where each record has a code or an identifier field and a 5-digit zip code field, for example. The zip file 516 has a 5-digit zip code and a 5-digit zip code, or a 5-digit zip code name like San Diego, Calif. and a 5-digit zip code. This file provides a way to specify zip codes using a one to one equivalency file without having to create a different form of specification for a ZIP Code geography list. This is also the preferred selection method for having the geography be the entire United States, which is done by pressing the "select all" option after selecting the ZIP code geography list.

In one embodiment, the 5-digit zip code is the base geography because it is the native geography for the mailing industry. Based on the geography codes or spatial definitions read from record 202, process 460 reads the appropriate equivalency files and builds an intermediate list of all 5-digit zip codes satisfying the geography codes or spatial definitions. Before writing this list to a zip list file 404, process 460 orders the list in 5-digit zip code order and removes duplicate entries from the list. The spatially defined geographies, e.g., radii and polygons, use a special equivalence file called the latitude and longitude zip windows file 518. The building of this zip windows file and the technique for determining which windows are overlapped by a spatially defined geography are described in detail in Applicant's issued patent, U.S. Pat. No. 5,956,397, which is hereby incorporated by reference.

At the completion of building the zip list file 404, process 500 proceeds to process 470, which builds an intermediate list or file 206/406 of all selected records and provides counts (e.g., the total number of selected records) to the user. Process 470 first reads the list specification record 202 and the zip list file 404. If a product/service profile is specified, process 470 reads the specified product/service profile database 502 and builds a product scores table 504 for the specified product/service, as described above. Next, process 470 begins to loop through the zip codes read from zip list 404. For each zip in the zip list, process 470 looks up the zip pointers in a geography (e.g., zip) index table 530 for the start of the zip code data in databases 540 to 546 which have data stored in zip code order.

In one embodiment, the zip index table 530 may have a set of records having a 5-digit zip field, a Demographic Attributes pointer field, a List pointer field, a Lat/Lon pointer field and a Geo-Demographic (GD) pointer field. A Geo-Demographic Directory 540 may have a set of records having the following fields: Zip+4, Segment #, and Demographic Data. A Geography (e.g., Zip+4) to Spatial Coordinate (e.g., Lat/Lon) Database 542 may have a set of records having the following fields: Zip+4, Latitude, Longitude, and Flags. A List Database 544 may have a set of records having the following fields: Zip+6, Last Name Code, First Name Code, Middle Initial Code, and Flags. A Demographic Attributes Database 546 may have a set of records having the following fields: Zip+6, Age, Children, and Own/Rent.

Process 470 then advances to the starting or first 5-digit zip (ZIP5) pointer location as illustrated by lines 538 to 532 for each of the databases 540 to 546. Using the list database 544 as the driver database, process 470 sequentially reads the other databases 540, 542 and 546 always maintaining a matching key relationship with database 544. In one embodiment, for each record in database 544, process 470 uses the matching key records in the other databases to perform all the screening criteria (i.e., determines if the record spatially lies within the defined polygon and has a product score for a product X above the selected screening value). If a record from database 544 passes all screening criteria, the record and the specified append data are written to the selected raw list file 206/406 and the selected record counts are incremented. If the record does not pass all the screening criteria, it is not written to file 206/406 and the counts are not incremented.

After completing the processing described above related to a record in database 544, process 470 proceeds to the next record on database 544 and tests the key against the current ZIP5. If the key is in the same ZIP5, it processes the record as above. This process is repeated until all records in the current ZIP5 in database 544 have been processed. When a record in database 544 with a new ZIP5 is read, process 470 falls back to the ZIP5 loop and reads the next ZIP5 in the Zip list 404. Each zip in the Zip list 404 is processed in the above manner until all zips in the Zip list 404 have been read. After processing all ZIP5s in Zip list 404, process 470 has counts that it can present to the user and has completed generating the selected raw list file 206/406. If the user does not approve the counts, process 500 returns to the process module 450 to start over. On the other hand, if the user approves the counts, process 500 moves to the process module 480.

Process 480 sequentially reads the Selected Raw List file 206/406 and builds a Final List file 208/408 that contains names and addresses in the format specified in the List Specification record 202. Process 480 is a specific embodiment of process 330 (FIG. 3). The name fields in the Final List record 208/408 are populated by retrieving the first 572, middle 574 and last name 576 table records corresponding to the first, middle and last name codes of the Selected Raw List record 206/406 in the corresponding First 572, Middle 574 and Last Name 576 databases.

The address fields in Final List 208/408 are populated by process 480 in a manner similar to that used for the name fields. However, the address construction requires a few more tables and a little more complex logic. In general terms, process 480 uses an address coding guide such as a ZIP+4 Address database 570 in conjunction with a collection of individual address component databases 552 to construct the first address line of a mailing address. The collection of databases 552 includes a Street Name database 554, a Street Address Range database 556, a Street Type database 558, a Street Direction database 560, a Secondary Address Type database 562, and a Secondary Address Range database 564. In one embodiment, the databases 554, 556, 558 and 560 each include a plurality of records having a code field and a field corresponding to the name of the database. First, process 480 uses the ZIP+4 portion of the ZIP+4 key in the Raw List file 206/406 to look up the base record for the ZIP+4 in the ZIP+4 Address database 570 and retrieve the ZIP+4 type. In one embodiment, there are six ZIP+4 address types: street, high-rise, firm, rural route, PO Box and General delivery. The rules for constructing the first line address vary slightly based on the address type. The rules for constructing the most common ZIP+4 address type, i.e., the street addresses, are explained in detail below. Given the street example, one skilled in the technology would apply the method and the rules for constructing the other address types.

The general method used by process 480 to construct the primary address or building number portion of a street address is as follows. A street range code from database 570 is used to retrieve the low street range value from the street range database 556. A street address range in database 556 typically has a high street range value and a low street range value that only differs in the last two digits, i.e., 4301 to 4399. Next, the last two digits of the ZIP+6 from the Raw List file 206/406 are used to replace the last two digits of the retrieved street range low value. Process 480 determines the street name portion of the address by using the name code from the Zip+4 Address database 570 to retrieve the street name from the Street Name database 554. Process 480 uses this same process to retrieve the street type from the Street Type database 558, and the street pre and post directions from the Street Direction database 560. At this point, process 480 has assembled all the components required to format the first line of a street address as specified in the List Specification record 202. High-rise and firm address type records require process 480 to use similar logic and access the Secondary Address Type database 562 and the Secondary Address Range database 564 to construct a secondary address, such as "APT 4A".

Next, process 480 uses the 5-digit zip code portion of the ZIP+6 in the Selected Raw List file 206/406 to retrieve the USPS preferred city and state associated with the 5-digit zip code from a City/State database 578. Once process 480 has completed constructing the name and address for each record, it writes a record to the Final List file 208/408 that corresponds to the specification in the List Specification record 202. Once process 480 has read all records from the Selected Raw List file 206/406, constructed the name and address, reformatted the records according to the specifications from Specification record 202 and written the last record to file

208/408, the process 500 illustrated by FIG. 5 has completed its task of creating the Final List file 208/408.

Figure 6:
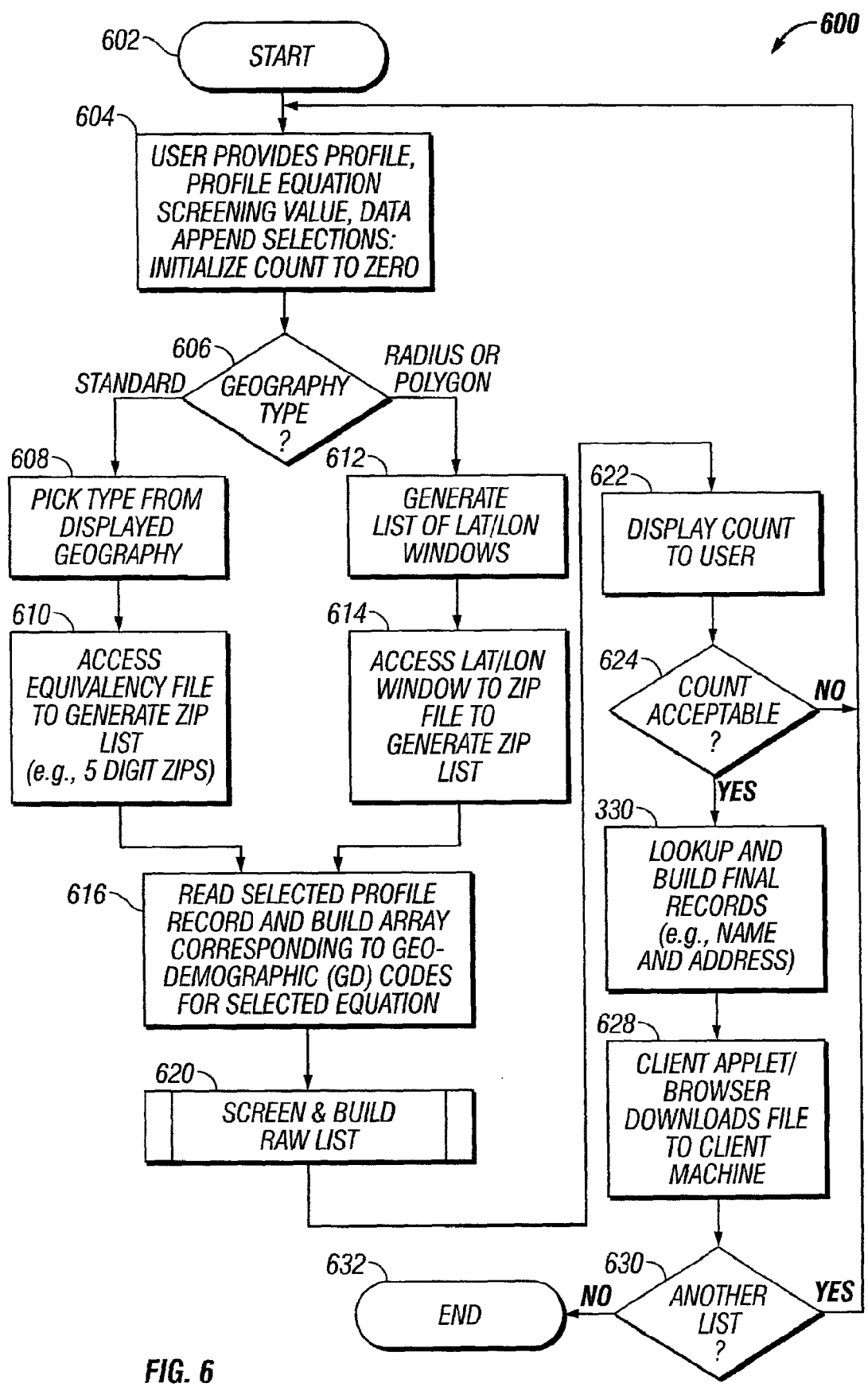
FIG. 6 is a flowchart of a process for generating contact lists corresponding to the structures defined in FIGS. 4 and 5.

Referring to FIG. 6, one embodiment of a list specification and creation process 600 will be described. Process 600 is one specific implementation of process 300 (FIG. 3), and may be performed by the modules 450, 460, 470 and 480 (FIG. 4).

Process 600 starts at state 602 and proceeds to state 604 where the process allows the user to select a product or service profile from a list of profiles. State 604 also prompts the user to select a consumption calculation method or equation from a list of methods, a profile score screening (threshold) value and whether the score is to be appended to the selected list or only to be used for screening. An example of a specific equation calculation method was previously described in the previous discussion related to FIG. 5. The sample equation described in conjunction with FIG. 5 did not use any consumption data. For consumption data, one of the equations is for the sample base consumption value, which is a value stored in the MVP files and is the average consumption value for members of the segment that consume the product or service. Another equation is for the base consumption value, which is the sample consumption value multiplied by the ratio of the sample count over the base count. The base consumption value provides an expected consumption amount by segment that includes both segment member product users and non-users. Both the sample and base segment consumption amounts may be transformed into index values by simply dividing the segment sample and base consumption values by the total sample and base consumption values and multiplying by 100. For the preferred Geodemographic system, MicroVision, the Claritas Infomark User's Guide and Reference Manuals describe in detail the various equations or methods that can be used to perform various mathematical computations to generate various types of segment scores and indices. In addition, these manuals discuss the advantages and disadvantages of the various equations for different applications and products. These manuals were previously incorporated by reference in the description of FIG. 5. Next, state 604 prompts the user to select from a list of other screening and append data items and values. After the user has completed the screening and data append selections, state 604 initializes the selected record count to zero and proceeds to a decision state 606.

Decision state 606 prompts the user to select either a standard geography or a custom geography (e.g., radius or polygon). If the user selects standard geography, process 600 proceeds to state 608. State 608 first presents to the user a list of geography types like ZIP, City, County, etc. and the user selects a geography type. Once the user has selected a geography type, state 608 presents to the user a list of geographies of this selected type. The user then selects the geographies to which they desire to notify, mail or market. After completing the geography selections at state 608, process 600 moves to state 610. State 610 looks up the selected geographies on the appropriate geography to zip code equivalency file (files 516-526) and generates a deduplicated (deduped) and ordered list of zip codes 404 (FIG. 5) that are geographically equivalent to the selected standard geographies. Upon completing state 610, process 600 proceeds to state 616.

Returning to state 606, if the user selected a custom geography, process 600 moves to a process 612 that generates a list of lat/lon defined windows. The process 612 is further described in conjunction with FIG. 7. In one embodiment, the lat/lon defined windows are approximate six mile square windows that have an individual identification code determined by the process 612 described in FIG. 7, and spatially overlap the radii or polygon area described in FIG. 7. Once the list of lat/lon windows has been determined by process 612, process 600 proceeds to state 614, which is similar to state 610 for standard geographies. State 614 uses the list of lat/lon windows from process 612 and generates a deduped and ordered list of zip codes 404 that potentially spatially overlap the custom geography area. Upon completing state 614, process 600 proceeds to state 616.

At state 616, process 600 reads the selected profile record and, based on the method or equation, computes a score for each of the individual segments. Examples related to various equations and calculation methods for determining a segment score were previously described in conjunction with FIG. 5 and FIG. 6 above. There are 50 segments in one implementation using MicroVision. These 50 scores corresponding to the 50 segments are loaded into a memory table with 50 cells, where the score for segment 1 is stored in cell 1 and the score for segment 2 is stored in cell 2, etc. After completing state 616, process 600 proceeds to a Screen and Build Raw List process 620.

Figure 8:
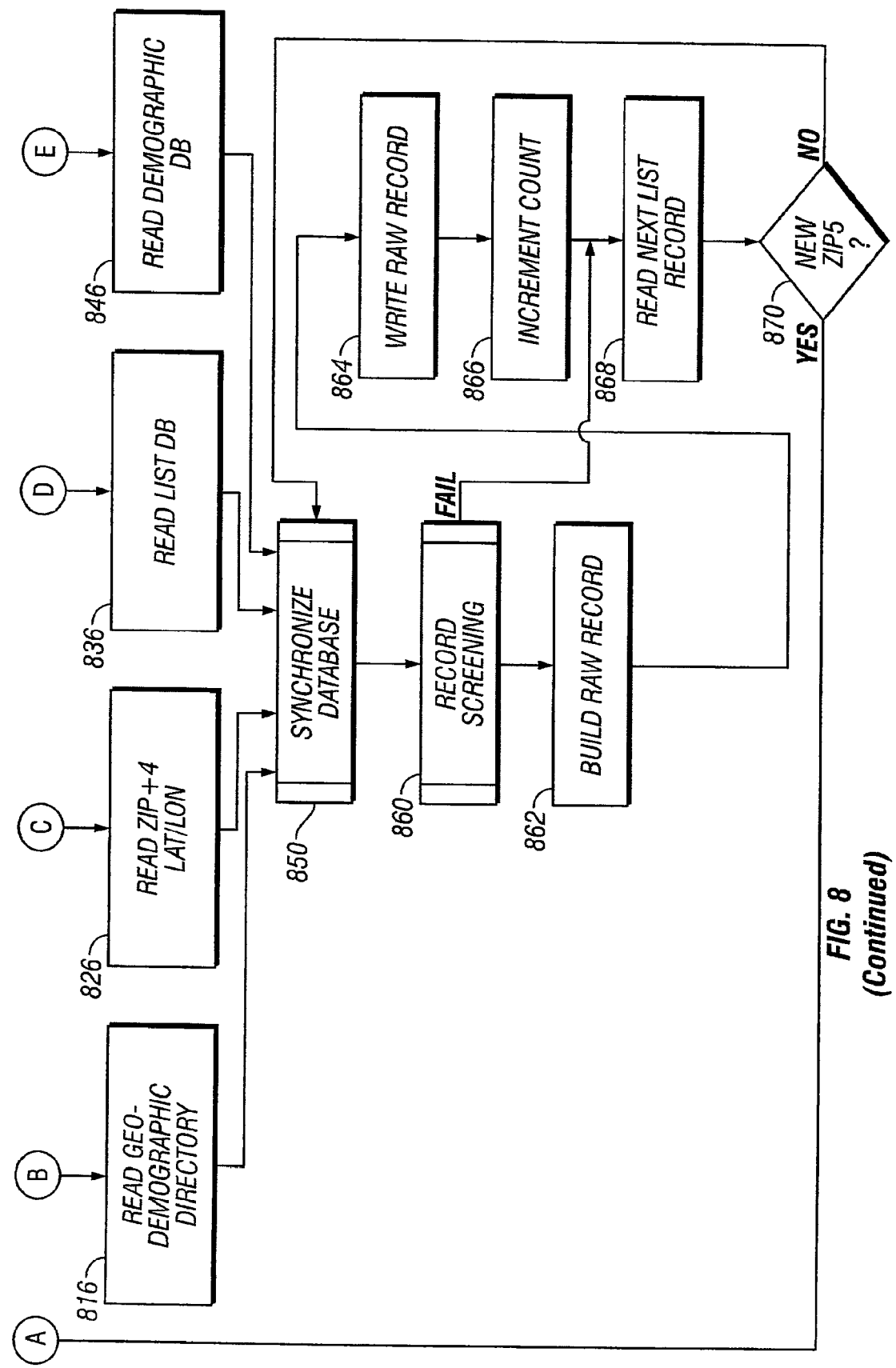
FIG. 8 is a flowchart of the Screen and Build Raw List function shown in FIG. 6.

Process 620 is described in general terms here and is further described in conjunction with FIG. 8. Process 620 may be a specific embodiment of process 470 (FIG. 4). Process 620 uses the Geography Code (e.g., Zip) List 404 (FIG. 5) as a source, and for each zip code in the list, uses the pointers in the Zip index 530 (FIG. 5) to read the first record for the current Zip in the detail files, i.e., the List Database 544, the Geo-Demographic Directory 540, the ZIP+4 to Lat/Lon Database 542 and the Demographic Attributes Database 546. Using the information for the List Specification Record 202 (FIG. 5), process 620 reads each record for the current Zip from the List Database 544 and matching records from the other three databases 540, 542 and 546, and determines whether the record has passed all the screening criteria. If the record fails any test, it is not written to the Selected Raw List file 206/406 (FIG. 5), while passing records are formatted according to the specifications in the List Specification Record 202 and written to the Selected Raw List file 206/406. Regardless of pass or fail, process 620 then proceeds to read the next record in the List Database 544 and repeats the process outlined above until a Zip is encountered in the List Database 544 that is different than the current ZIP on Zip List 404. Process 620 then moves to the next ZIP and performs the above procedure until all Zips on Zip List 404 have been processed.

After completing process 620 as described above, where process 620 has read and tested all candidate records within the geographic areas specified at state 604, as well as counted the records that passed all screening criteria, process 600 then advances to state 622. State 622 presents this count of records to the user and then process 600 moves to a decision state 624 to get the user's response as to whether the count is acceptable. If the user rejects the count, process 600 moves back to state 604. The user may reject the count, for example, because the count exceeds the number of pieces that the user has had printed for the mailing. If the user accepts the count, as determined at the decision state 624, process 600 moves to a process 330.

Figure 9:
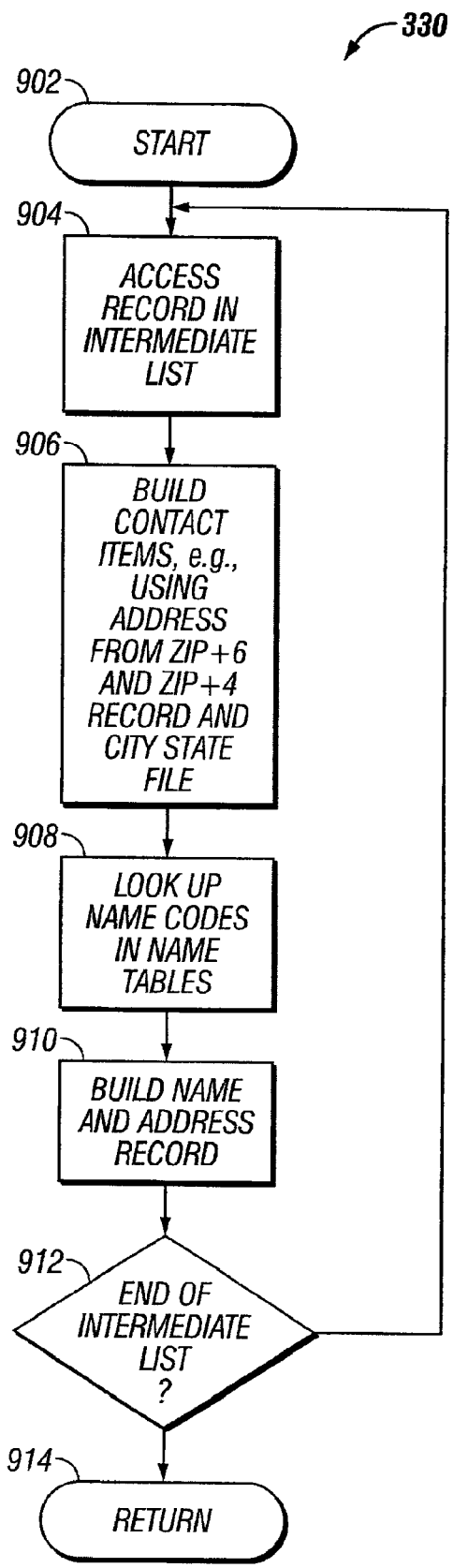
FIG. 9 is a flowchart of the Lookup and Build Final Contact Records function shown in FIG. 6.

Process 330 is generally described here and is further described in conjunction with FIG. 9. In one embodiment, process 330 sequentially reads each record in the Intermediate list 206/406 and uses the pointers in this list to retrieve the appropriate name stored in the Name tables 572, 574 and 576 (FIG. 5) preferably stored in memory to retrieve a full name. Process 330 then uses the full ZIP+6 or delivery point code (DPC) from the Raw list 206/406 to construct the street portion of a mailing address by accessing tables 570 and 552 preferably stored in memory. Finally, process 330 uses the 5-digit Zip Code portion of the ZIP+6 from the Raw List 206/406 to access the City/State database 578 to build the City and State portion of the mailing address. Upon completion of building the name and address, process 330 writes the formatted final record to the Final List file 208/408.

After process 330 operates on all records in the Intermediate list 206/406, process 600 moves to state 628. At state 628, process 600 downloads the Final List file 208/408 to a specified network address such as a user-specified node. This user-specified node may be the same node as the user specification node for generating the list specification, or the nodes may be different nodes. In another embodiment, other ways of delivering the file are envisioned. Process 600 then proceeds to decision state 630 and inquires if the user wants to specify another list. If the user responds with "yes," then process 600 returns to state 604 to begin process 600 again, otherwise if the user responds with "no," process 600 advances to an end state 632.

Figure 7:
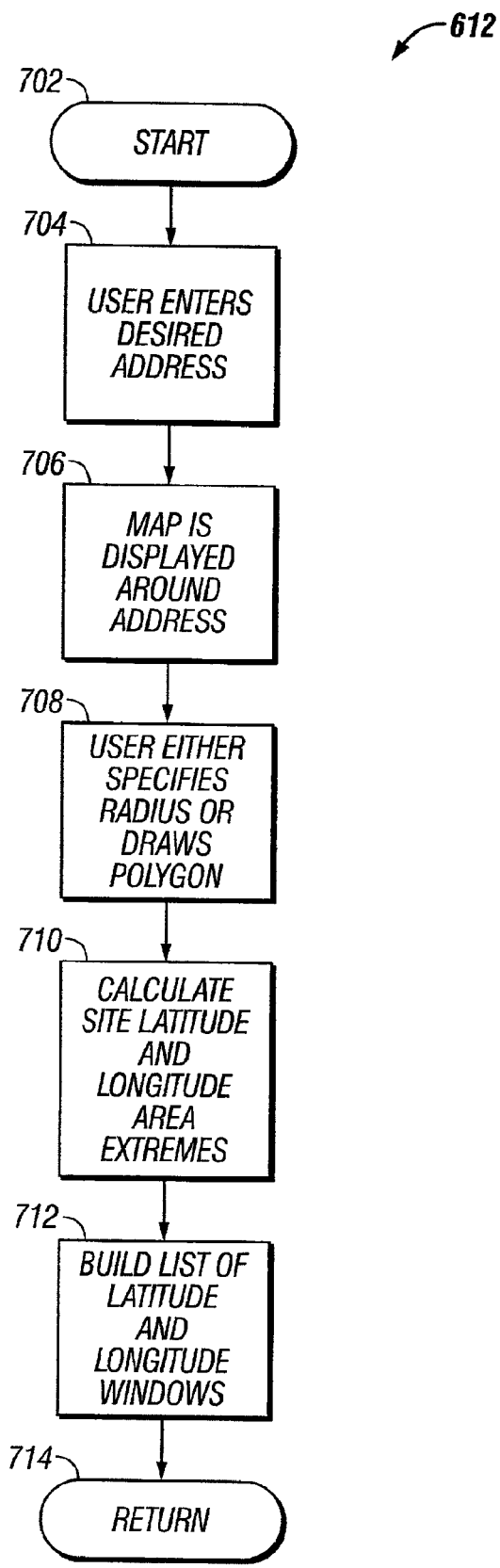
FIG. 7 is a flowchart of the Generate List of Latitude/Longitude Windows function shown in FIG. 6.

Referring to FIG. 7, one embodiment of radius and polygon definition components of the present invention as used in the process 612 will be described. Process 612 is directed to specifying the radius and polygon definition requirements for a direct marketing list using mapping tools. Process 612 begins at a start state 702 and provides the user with a mapping interface. In one embodiment, mapping software for use over a network is mapping software such as available from MapQuest™. Process 612 then proceeds to state 704 where the mapping software prompts the user for a location identifier. The location identifier can be any identifier where there is a way available for translating the identifier to a latitude and longitude coordinate. Examples of identifiers are a phone number, an address, an intersection, a DPC code, latitude and longitude coordinates, or a landmark name like Yankee stadium. Once the user has provided a location identifier at state 704, process 612 moves to state 706 where, in one embodiment, the mapping software translates the location identifier to a latitude and longitude and displays a map around the user-specified location. The user may zoom in or out until the correct map scale is displayed. After the user has visually verified that the location is correct, process 612 moves to state 708 and asks the user to enter a radius or to draw a polygon trade area on the map. If the user identified a polygon trade area on the map, state 708 digitizes the trade area by, in one embodiment, identifying and clicking on the map screen location of the vertices of the trade area using the left mouse button. At the completion of state 708, process 612 moves to state 710.

At state 710, process 612 determines the latitude and longitude extremes of the user's custom defined area and then moves to state 712. In one embodiment, state 712 uses the extremes to build a deduplicated and ordered list of one-tenth of a degree rectangular latitude and longitude spatial windows that spatially overlap the user-defined area. The processing performed at states 710 and 712 is described in Applicant's U.S. Pat. No. 5,956,397, which is hereby incorporated by reference. Upon completing state 712, process 612 moves to a return state 714 and returns to process 600 (FIG. 6).

Referring to FIG. 8 (and FIG. 5), one embodiment of process 620 for reading records within selected ZIP codes contained in the ZIP List 404 from databases 540, 542, 544 and 546, performing a screening function on each read record based on specifications defined in the List Specification Record 202, and counting and writing passing records to the Selected Raw List file 206/406 will be described. A preferred implementation of FIG. 8 includes preprocessing on the databases 540, 542, 544 and 546, so that database 540, 542 and 546 do not contain a matching key record that is not on database 544. Additionally, the databases 540, 542, 544 and 546 are sorted by a match key in descending order. This off-line preprocessing may be done in order to improve real-time processing performance for this list generation application.

Process 620 begins at start state 802, moves to state 804 to read a record on the Zip List 404 and proceeds to a decision state 806. Decision state 806 tests to see if all records have been read from the Zip List 404. If all records have been read, process 620 proceeds to a return state 808 and returns to process 600 (FIG. 6). Otherwise, process 620 advances to state 810 and reads the current ZIP record in the Zip Index File 530 to get the file offset pointers for this ZIP code into each of the four detailed databases 540, 542, 544 and 546, so that it can read the first record in this ZIP code from each of the databases. In one embodiment, the following three-step process is identical for all four databases and each will be described individually below. For the Geo-Demographic database 540, process 620 proceeds to state 812 and gets the current zip file offset pointer for the Geo-demographic database 540. Process 620 then moves to state 814 where it advances to the offset pointer position in the Geo-Demographic Database 540 and moves to state 816 where it reads the first record in the current ZIP code in the Geo-Demographic Database 540. In parallel to state 812, process 620 proceeds to state 822 where it gets the current zip file offset pointer for the ZIP+4 to Lat/Lon Database 542. Process 620 then moves to state 824 where it advances to the offset pointer position in the ZIP+4 to Lat/Lon Database 542 and moves to state 826 where it reads the first record in the current ZIP code in the ZIP+4 to Lat/Lon Database 542. In parallel to states 812 and 822, process 620 proceeds to state 832 where it gets the current zip file offset pointer for the List Database 544. Process 620 then moves to state 834 where it advances to the offset pointer position in the List Database 544 and moves to state 836 where it reads the first record in the current ZIP code in the List Database 544. In parallel to states 812, 822 and 832, process 620 proceeds to state 842 where it gets the current zip file offset pointer for the Demographic Database 546. Process 620 then moves to state 844 where it advances to the offset pointer position in the Demographic Database 546 and moves to state 846 where it reads the first record in the current ZIP code in the Demographic Database 546. In one embodiment, the groups of states 812-816, 822-826, 832-836 and 842-846 may each be executed by a separate thread in an operating system capable of multithreaded operation, e.g., Windows NT and Unix. After reading the first record in the current ZIP for all four detailed record databases 540, 542, 544 and 546, process 620 moves to a Database Synchronization process 850.

The Database Synchronization process 850 ensures that the current in-memory match keys for the supporting databases 540, 542 and 546 with their associated data items all match the current match key associated with the List Database 544, which is the driver database. Process 850 will be further described in conjunction with FIG. 10. At the point process 850 has synchronized the match keys in all four databases, process 620 proceeds to a Record Screening process 860. The process 860 uses the information associated with the current record from the detailed databases 540, 542, 544 and 546 and performs spatial, product score and other screening tests as defined in the List Specification Record 202. Process 860 will be further described in conjunction with FIG. 11. At the point a detail record fails any test in process 860, process 620 moves to state 868. If a record passes all tests in process 860, process 620 advances to state 862.

At state 862, process 620 uses the specifications defined in the List Specification Record 202 in conjunction with the detailed data from the current record in the detailed record databases 540, 542, 544 and 546 to build a memory version of the raw selected record. After building the memory version of the raw record in state 862, process 620 moves to state 864 where it writes the raw record to disk or other form of mass storage. Next, process 620 advances to state 866 where it adds one to the selected record count. Process 620 then moves to state 868 where it reads the next record from the List Database 544. Process 620 then proceeds to a decision state 870. If decision state 870 determines that the zip code of the record just read from database 544 is different than the current Zip in the ZIP List 404, then process 620 returns to state 804 to read the ZIP List. If the last record read from the List Database 544 matches the current ZIP code from the ZIP List 404, then decision state 870 directs process 620 to move back to the Synchronize Database process 850.

Referring to FIG. 9 (and FIG. 5), one embodiment of process 330 building the name and address record components of the present invention will be described. In other embodiments, other contact record components are built. Process 330 reads all the records of the Intermediate file (Selected Raw list) 206/406, and uses the pointers in these records to lookup and build a full name and address. Process 330 may also re-format the record and write out a final record that is formatted to user specifications and contains a full name and address, in one embodiment.

Process 330 begins at start state 902 and proceeds to state 904 where it reads a record from the Intermediate list 206/406 and moves to state 906 to build contact components. For example, at state 906, process 330 uses the ZIP+6 from the read record of the list 206/406 in conjunction with memory resident database files 570, 552 and 578 that were created from the USPS ZIP+4 and the City/State file so as to build a USPS CASS certified address. Upon completing state 906, process 330 moves to state 908. At state 908, process 330 uses the first, middle and last name pointers from the Intermediate file 206/406 to lookup the first name in memory table 572, the middle initial in memory table 574 and the last name in memory table 576. Process 330 then moves to state 910 and takes the address derived at state 906, the name derived at state 908 and other data from the current record of the Intermediate file 206/406, and creates a new formatted record, which is written to the Final List file 208/408. After writing the record, process 330 moves to a decision state 912. If decision state 912 determines that there are still remaining records to process on Intermediate list 206/406, then process 330 moves back to state 904 to access the next record in the list. If all records have been read from the list 206/406, then process 330 moves to a return state 914 and returns to process 600 (FIG. 6).

Figure 10:
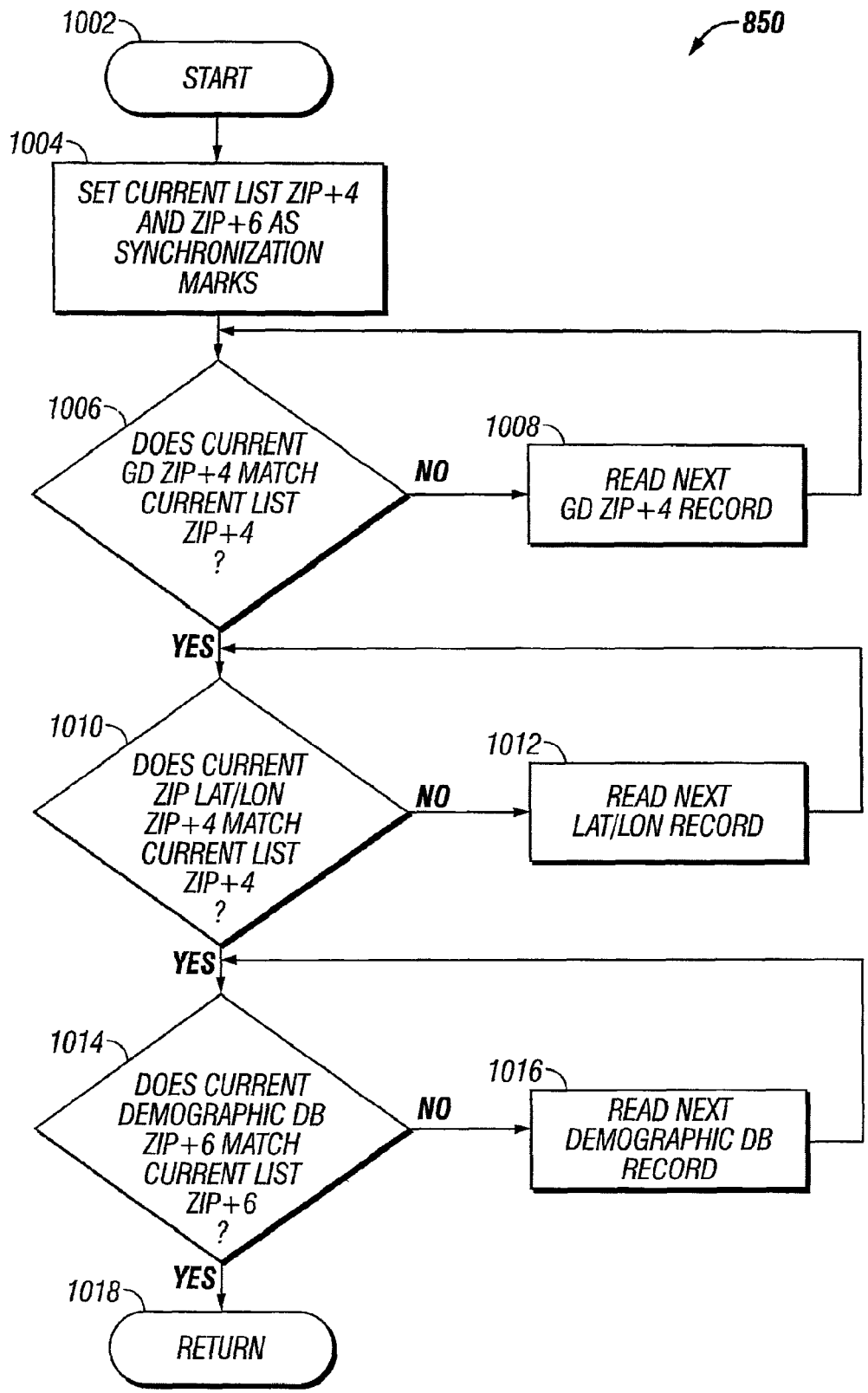
FIG. 10 is a flowchart of the Synchronize Databases function shown in FIG. 8.

Referring to FIG. 10 (and FIG. 5), one embodiment of the Database Synchronization process 850 will be described. The Database Synchronization Process 850 ensures that the current in-memory match keys for the supporting databases (Geo-Demographic 540, ZIP+4 to Lat/Lon 542 and Demographic 546) with their associated data items all match the current match key associated with the List Database 544, which is the driver database.

Process 850 begins at start state 1002 and proceeds to state 1004 and sets current List Database ZIP+4 and ZIP+6 values as synchronization marks. State 1004 sets the ZIP+4 and ZIP+6 synchronization marks to the current value of these two items in the current List Database 544 record. Process 850 then proceeds to a decision state 1006 to determine if the current Geo-Demographic Database ZIP+4 matches the current synchronized List Database ZIP+4. If the two ZIP+4 s do not match, then process 850 proceeds to state 1008 where it reads the next record from the Geo-Demographic Database 540 and moves back to the decision state 1006. If the two ZIP+4 s match at decision state 1006, then process 850 proceeds to a decision state 1010 where it compares the current synchronized ZIP+4 to the ZIP+4 on the current record from the ZIP+4 to Lat/Lon Database 542. If the two ZIP+4 s do not match, then process 850 proceeds to state 1012 where it reads the next record from the ZIP+4 to Lat/Lon Database 542 and moves back to the decision state 1010. If the two ZIP+4 s match at decision state 1010, then process 850 proceeds to a decision state 1014 where it compares the current synchronized ZIP+6 to the ZIP+6 on the current record of the Demographic Database 546. If the two ZIP+6 s do not match, then process 850 proceeds to state 1016 where it reads the next record from the Demographic Database 546 and moves back to the decision state 1014. If the two ZIP+6 s match at decision state 1014, then process 850 proceeds to return state 1018 and returns to process 620 (FIG. 8). Upon reaching return state 1018, all three-support databases 540, 542, and 546 have been synchronized on their ZIP+4 or ZIP+6 match keys with the List Database 544.

Figure 11:
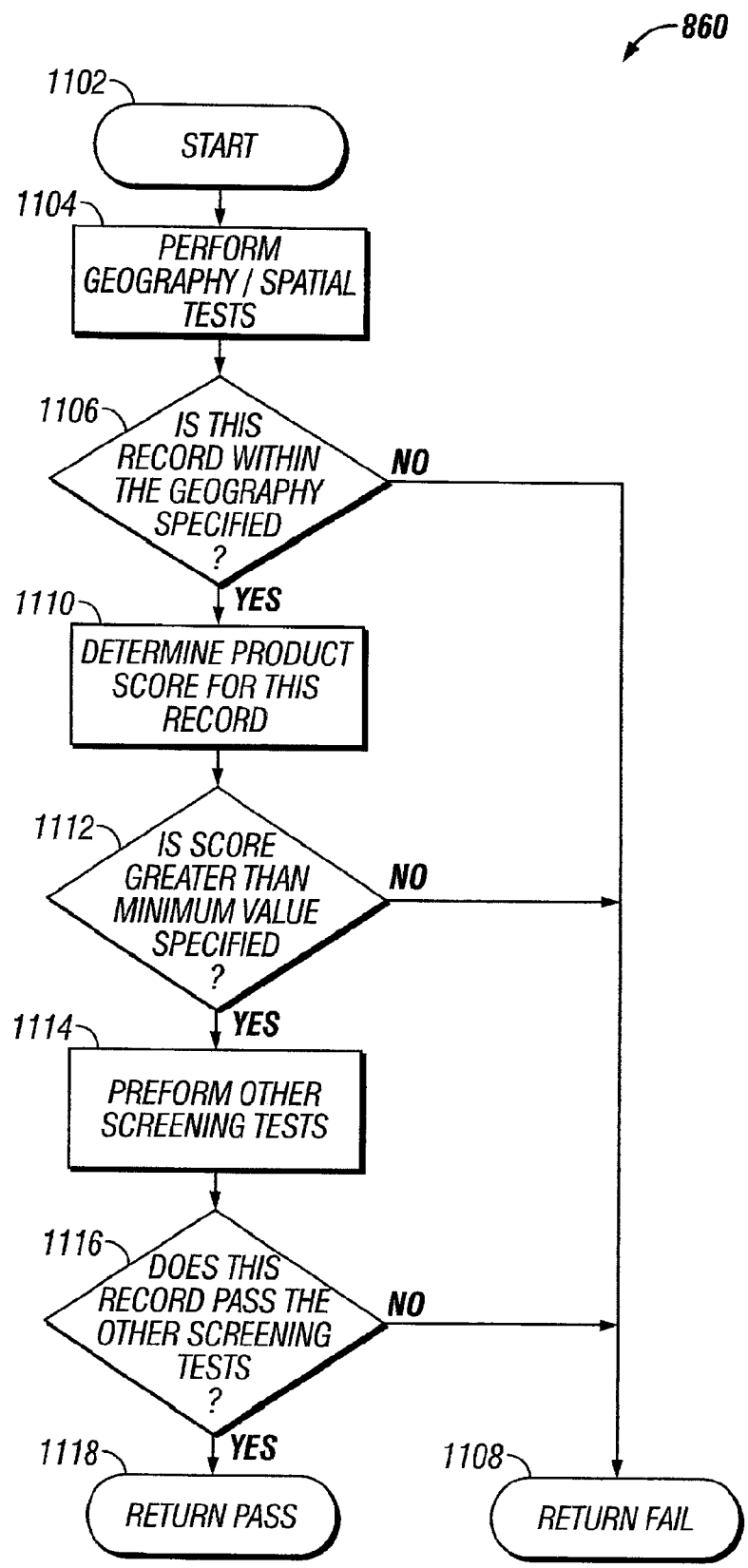
FIG. 11 is a flowchart of the Record Screening function shown in FIG. 8.

Referring to FIG. 11 (and FIG. 5), one embodiment of the Record Screening Process 860 will be described. The process 860 utilizes the information associated with the current record from the detailed databases 540, 542, 544 and 546, and performs spatial, product score and other screening tests as defined in the List Specification Record 202.

Process 860 begins at start state 1102 and moves to state 1104 to perform geography/spatial tests. One embodiment utilizes methods of determining if a record with a specific coordinate, such as a latitude and longitude coordinate, is spatially located inside or outside an area of any size or shape that is defined by a point (with coordinates) and a radius, or a polygon defined by multiple vertices (each having coordinates), such as described in detail in Applicant's U.S. Pat. No. 5,956,397, which is hereby incorporated by reference. Records that pass the above geography/spatial test as being inside the desired mailing area are flagged to be passing, while records that fail the test are flagged to be failing.

In cases where the geography is a standard geography, like a county, then the upstream county to zip code equivalency file 524 provides a 99+% geographic solution to this problem. If this level of accuracy is acceptable, then all records are flagged as passing the geography/spatial tests 1104. In order to get the remaining less than 1% accuracy, the system needs to carry a county code on one of the detailed files. The preferred file is this case is the GDT ZIP+4 to Lat/Lon file 542 as GDT provides the state and county in which each ZIP+4 is located and ZIP+4 s do not cross county boundaries. In this case, tests 1104 would have to compare the state and county code on the current record to the list of selected state and county codes from the List Specification Record 202. If the current record's state and county code is on the List Specification record, then the record is flagged as passing the geography test, otherwise it is flagged as failing the geography test.

After testing and flagging a record as either passing or failing at the geography/spatial tests 1104, process 860 moves to a decision state 1 106. If the current record's geography/spatial tests flag is set as failing, process 860 sets its overall record return flag to fail and moves to a return fail state 1108 and returns to process 620 (FIG. 8). If the current record's geography/spatial tests flag is set as passing, process 860 proceeds to state 1110 and determines a product score. The score for a product scoring method such as MicroVision was previously computed for the product selected in the List Specification Record 202 and the score for each of the fifty MicroVision segments is stored in the Product Scores table 504. State 1110 uses the MicroVision code values of one to fifty associated with the current record that was previously read from the Geo-Demographic Directory Database 540 and looks up this value in the Products Scores table 504 to determine the product score for the current record. As previously discussed, there are other methods for determining a product score that could readily be employed by one skilled in the art, but the method described above is preferred because of its speed, simplicity and the large number of products and services that have MicroVision profiles.

After process 860 has determined a product or service score at state 1110, it moves to a decision state 1112 and tests the determined score against the minimum acceptable score value from the List Specification Record 202. If the score determined by state 1110 is less than the minimum score from the List Specification Record 202, then process 860 sets the product score flag as failing. If the score determined by state 1110 is greater than or equal to the minimum score from the List Specification Record 202, then process 860 sets the product score flag as passing. If no product score screening was selected by the user, state 1112 automatically sets the product score flag as passing.

If the product score flag is set as failing at decision state 1112, then process 860 sets its overall record return flag to fail and moves to the return fail state 1108 and returns to process 620 (FIG. 8). If the product score flag is set as passing, then process 860 advances to state 1114 to perform other screening tests. The other screening criteria specifications, such as name-only records, no P.O. Box or Rural route records, and records with an estimated household income over a selected amount (e.g., $50,000), are retrieved from the List Specification Record 202. State 1114 sets the other screening test flag value as passing and then tests the specified screening criteria against the corresponding values of the current record. If the current record fails any test, the other screening test flag is set as failing.

Upon performing all other screening tests at state 1114, process 860 proceeds to a decision state 1116 to determine if the current record passes the other screening tests. If the current record's other screening test flag is set as failing, process 860 sets its overall record return flag to fail and moves to the return fail state 1108 and returns to process 620 (FIG. 8). If the current record's other screening test flag is set as passing, process 860 sets its overall record return flag to pass, and moves to a return pass state 1118 to return to process 620 (FIG. 8).

Specific blocks, sections, devices, functions and modules may have been set forth. However, a skilled technologist will realize that there are many ways to partition the system of the present invention, and that there are many parts, components, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

The invention claimed is:

1. A computerized real-time, interactive method of building a list of contact records based on selected criteria, the method comprising:
    obtaining a geographic area definition, a classification and a threshold value associated with the classification;
    generating a search geography code list of geography codes based on the geographic area definition;
    determining a selected set of records in a list database based on the geography codes in the search geography code list;
    identifying a spatial coordinate and a socio-economic code corresponding to a sub-geography code for each record in the selected set of records;
    identifying a classification score for each record in the selected set of records based on the socio-economic code;
    determining identified records in the selected set of records based on a comparison of the classification score with the threshold value and if the spatial coordinate associated with the record is located within the geographic area definition;
    providing a contact address corresponding to each identified record in the selected set of records if a minimum user threshold number of records are identified;
    providing selected append data corresponding to each identified record in the selected set of records; and
    transmitting to a user the append data corresponding to the identified records having contact addresses.

2. The method defined in claim 1, additionally comprising transmitting to a user the contact addresses for the records in the identified records having contact addresses.

3. The method defined in claim 1, wherein the append data includes at least one of the following: contact name, classification score, distance, presence of child, age of child, estimated household income, ownership status, length of time at address, date of birth, gender, marital status, business name, SIC code, number of employees and sales.

4. The method defined in claim 1, wherein providing selected append data includes selecting at least one append data type from a list of displayed append data types.

5. The method defined in claim 1, additionally comprising providing a contact name and a secondary contact address corresponding to each identified record in the selected set of records if a minimum user threshold number of records are identified.

6. The method defined in claim 5, wherein the secondary contact address comprises a telephone number.

7. The method defined in claim 1, wherein the list database has a plurality of records and a least one record comprises a zip+6 code and a name code.

8. The method defined in claim 1, wherein the geographic area definition comprises:
    a desired location identifier; and
    a radius.

9. The method defined in claim 1, wherein the geographic area definition comprises:
    a desired address; and
    a polygon around a location identified by the address.

10. The method defined in claim 9, wherein the polygon is displayed on a displayed map of the area identified by the address.

11. The method defined in claim 1, wherein the geographic area definition comprises a standard geography type from a list of displayed geography types.

12. The method defined in claim 11, wherein the geographic area definition further comprises a geography code or a name of a geographical entity.

13. The method defined in claim 12, wherein the geography code comprises a zip code.

14. The method defined in claim 1, wherein the classification is part of a list of displayed classifications.

15. The method defined in claim 1, wherein the threshold value associated with the classification is part of a list of displayed threshold values.

16. The method defined in claim 1, wherein the list of contact records comprises a mailing list.

17. The method defined in claim 1, wherein the list of contact records comprises a plurality of records, and wherein one of the records includes at least one of the following: physical address, electronic address, telephone number, facsimile number, Internet Protocol address, pager number, network address or universal resource locator.

18. The method defined in claim 1, wherein the geography codes are a hierarchical component of a zip code.

19. The method defined in claim 1, wherein the spatial coordinate comprises an interleaved latitude and longitude.

20. A real-time, interactive method of building a contact list based on selected criteria, the method comprising:
permitting a user to interactively generate a list specification in real-time, the list specification comprising a geographic area definition, a classification and a threshold value associated with the classification;
receiving the list specification over a network by a server having a memory; and
building a contact list on the server in real-time, based on the list specification, by
generating a search geography code list of geography codes based on the geographic area definition,
determining a selected set of records in a list database based on the geography codes in the search geography code list,
identifying a spatial coordinate and a socio-economic code corresponding to a sub-geography code for each record in the selected set of records,
identifying a classification score for each record in the selected set of records based on the socio-economic code,
determining identified records in the selected set of records based on a comparison of the classification score with the threshold value and if the spatial coordinate associated with the record is located within the geographic area definition,
providing a contact address corresponding to each identified record in the selected set of records if a minimum user threshold number of records are identified,
providing selected append data corresponding to each identified record in the selected set of records, and
transmitting to a user the append data corresponding to the identified records having contact addresses.

21. The method defined in claim 20, wherein the geographic area definition may be of any size and any shape.

22. The method defined in claim 20, wherein the list specification further comprises a product selected from a plurality of products and a threshold score for the product.

23. The method defined in claim 20, wherein the threshold score for the product is indicative of a predetermined level of consumption of the product.

24. The method defined in claim 20, wherein building the contact list on the server further includes receiving an approval of the number of records in the selected set of records.

25. The method defined in claim 24, further including receiving a selection of screening data from the user.

26. The method defined in claim 25, wherein generating the intermediate list determining the selected set of records includes applying the screening data.

27. The method defined in claim 25, further including receiving a selection of at least one screening data type from a list of screening data types.

28. The method defined in claim 20, wherein the append data includes at least one of the following: age, gender, marital status, estimated income, property value, ownership status, length of time at address, education level, occupation, presence of child, and age of child.

29. The method defined in claim 20, wherein providing selected append data includes receiving a selection of selecting at least one append data type from a list of append data types.

30. The method defined in claim 20, wherein the list database is stored in random access memory.

31. The method defined in claim 20, wherein the contact list comprises contact addresses corresponding to each identified record and the append data corresponding to the identified records having contact addresses, the method further comprising transmitting the contact list to a first client machine.

32. The method defined in claim 31, wherein transmitting the contact list includes receiving an approval of a number of records in the contact list.

33. The method defined in claim 31, additionally comprising collecting information via a browser to generate the list specification.

34. The method defined in claim 33, wherein the browser collects the information at a second client machine.

35. The method defined in claim 34, wherein the first client machine and the second client machine are the same machine.

36. The method defined in claim 31, additionally comprising transmitting a message to electronic addresses listed in the contact list transmitted to the first client machine.

37. The method defined in claim 31, wherein the contact list is subject to one of the following restrictions: read-only usage, one-time usage, or unlimited usage.

38. The method defined in claim 20, additionally comprising collecting information via an applet to generate the list specification.

39. The method defined in claim 20, further including:
receiving a desired address; and
receiving a radius from the desired address.

40. The method defined in claim 20, furthering including:
receiving a desired location; and
receiving a polygon around a location identified by the location identifier.

41. The method defined in claim 40, wherein receiving the polygon includes receiving a drawing of the polygon on a displayed map of the area identified by the address.

42. The method defined in claim 20, further including receiving a selection of a standard geography type from a list of standard geography types.

43. The method defined in claim 42, further including receiving a geography code or a name of a geographical entity.

44. The method defined in claim 43, wherein the geography code comprises a zip code.

45. The method defined in claim 42, wherein the standard geography type is selected from the list of standard geography types including zip codes, dominant marketing areas, cities, places, counties, states, telephone area codes, minor civil divisions, metropolitan statistical areas, legislative districts, voting districts and school districts.

46. The method defined in claim 20, further including:
receiving a selection of a product from a list of displayed products; and
receiving a threshold score associated with the product.

47. The method defined in claim 20, wherein the contact list comprises a plurality of records and one of the records of the contact list includes at least one of the following: at least a partial name, physical address, electronic address, telephone number, facsimile number, pager number, or universal resource locator.

48. The method defined in claim 20, wherein the contact list comprises a mailing list.

49. The method defined in claim 20, wherein the contact list comprises a household list, a business list or an individual list.

50. A real-time, interactive method of building a contact list based on selected criteria, the method comprising:
   interactively generating a list specification in real-time, the list specification comprising a geographic area definition, a classification and a threshold value associated with the classification; and
   building a contact list on a server in real-time based on the list specification record by
      generating a search geography code list of geography codes based on the geographic area definition,
      determining a selected set of records in a list database based on the geography codes in the search geography code list,
      identifying a spatial coordinate and a socio-economic code corresponding to a sub-geography code for each record in the selected set of records,
      identifying a classification score for each record in the selected set of records based on the socio-economic code,
      determining identified records in the selected set of records based on a comparison of the classification score with the threshold value and if the spatial coordinate associated with the record is located within the geographic area definition,
      providing a contact address corresponding to each identified record in the selected set of records if a minimum user threshold number of records are identified,
      providing selected append data corresponding to each identified record in the selected set of records, and
      transmitting to a user the append data corresponding to the identified records having contact addresses.

51. The method defined in claim 50, additionally comprising collecting information so as to generate the list specification at the server.

52. The method defined in claim 50, wherein the contact list comprises a plurality of records, and wherein one of the records includes at least one of the following: physical address, electronic address, telephone number, facsimile number, Internet Protocol address, pager number, or universal resource locator.

* * * * *